(12) United States Patent
Hagiwara

(10) Patent No.: US 7,088,416 B2
(45) Date of Patent: Aug. 8, 2006

(54) LIQUID CRYSTAL DEVICE HAVING PRONGED DUMMY ELECTRODES AND ELECTRONIC DEVICE

(75) Inventor: Takeshi Hagiwara, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/874,111

(22) Filed: Jun. 22, 2004

(65) Prior Publication Data
US 2004/0239858 A1 Dec. 2, 2004

Related U.S. Application Data

(62) Division of application No. 09/951,356, filed on Sep. 13, 2001, now Pat. No. 6,774,968.

(30) Foreign Application Priority Data

| Sep. 14, 2000 | (JP) | ............................. 2000-280807 |
| Mar. 7, 2001 | (JP) | ............................. 2001-064069 |
| Aug. 29, 2001 | (JP) | ............................. 2001-260110 |

(51) Int. Cl.
*G02F 1/1345* (2006.01)
(52) U.S. Cl. ...................... 349/149; 349/139; 349/153
(58) Field of Classification Search ........ 349/149–152, 349/153, 155, 157
See application file for complete search history.

(56) References Cited

U.S. PATENT DOCUMENTS

| 5,200,847 | A | 4/1993 | Mawatari et al. |
| 5,467,210 | A | 11/1995 | Kishigami |
| 5,619,358 | A | 4/1997 | Tanaka et al. |
| 5,739,888 | A | 4/1998 | Ogura et al. |
| 5,760,855 | A | 6/1998 | Nakase et al. |
| 5,798,812 | A | 8/1998 | Nishiki et al. |
| 5,838,412 | A * | 11/1998 | Ueda et al. .................. 349/150 |
| 5,982,470 | A | 11/1999 | Nakahara et al. |
| 5,986,739 | A | 11/1999 | Kobayashi |
| 6,052,169 | A | 4/2000 | Kim |
| 6,172,732 | B1 * | 1/2001 | Hayakawa et al. ......... 349/152 |
| 6,507,384 | B1 | 1/2003 | Endo et al. |

FOREIGN PATENT DOCUMENTS

| JP | 62-245220 | 10/1987 |
| JP | 63-266427 | 11/1988 |

(Continued)

OTHER PUBLICATIONS

Examination report issued Jul. 15, 2003 for the corresponding Japanese Application No. 2001-260110.

(Continued)

*Primary Examiner*—Andrew Schechter
*Assistant Examiner*—Michael H. Caley
(74) *Attorney, Agent, or Firm*—Harness, Dickey & Pierce, P.L.C.

(57) ABSTRACT

A liquid crystal device comprising a pair of substrates 3a and 3b which are bonded together by a sealing material 2, and a plurality of electrodes 9a and 9b which are formed on the inside surfaces of these substrates. The electrodes 9a have wiring lines 17a and 17b which pass through the sealing material 2 and extend to a substrate projecting part 4a, and dummy patterns 19a which pass through the sealing material 2 at the side opposite to the wiring lines 17a and 17b; dummy patterns 19a are formed with a width which is smaller than the width of the electrodes 9a inside the region surrounded by the sealing material 2; preferably, they are formed with the same width as the wiring lines 17a.

7 Claims, 17 Drawing Sheets

FOREIGN PATENT DOCUMENTS

| | | |
|---|---|---|
| JP | 03-163418 | 7/1991 |
| JP | 04-242719 | 8/1992 |
| JP | 5-30841 | 4/1993 |
| JP | 05-297393 | 11/1993 |
| JP | 8-076137 | 3/1996 |
| JP | 9-179131 | 7/1997 |
| JP | 10-068963 | 3/1998 |
| JP | 10-228026 | 8/1998 |
| JP | 11-084404 | 3/1999 |
| JP | 11-142865 | 5/1999 |
| JP | 11-223841 | 8/1999 |
| JP | 2000-075312 | 3/2000 |
| JP | 2000-187236 | 7/2000 |

OTHER PUBLICATIONS

Communication from Japanese Patent Office regarding counterpart application.

* cited by examiner

[FIG. 1]
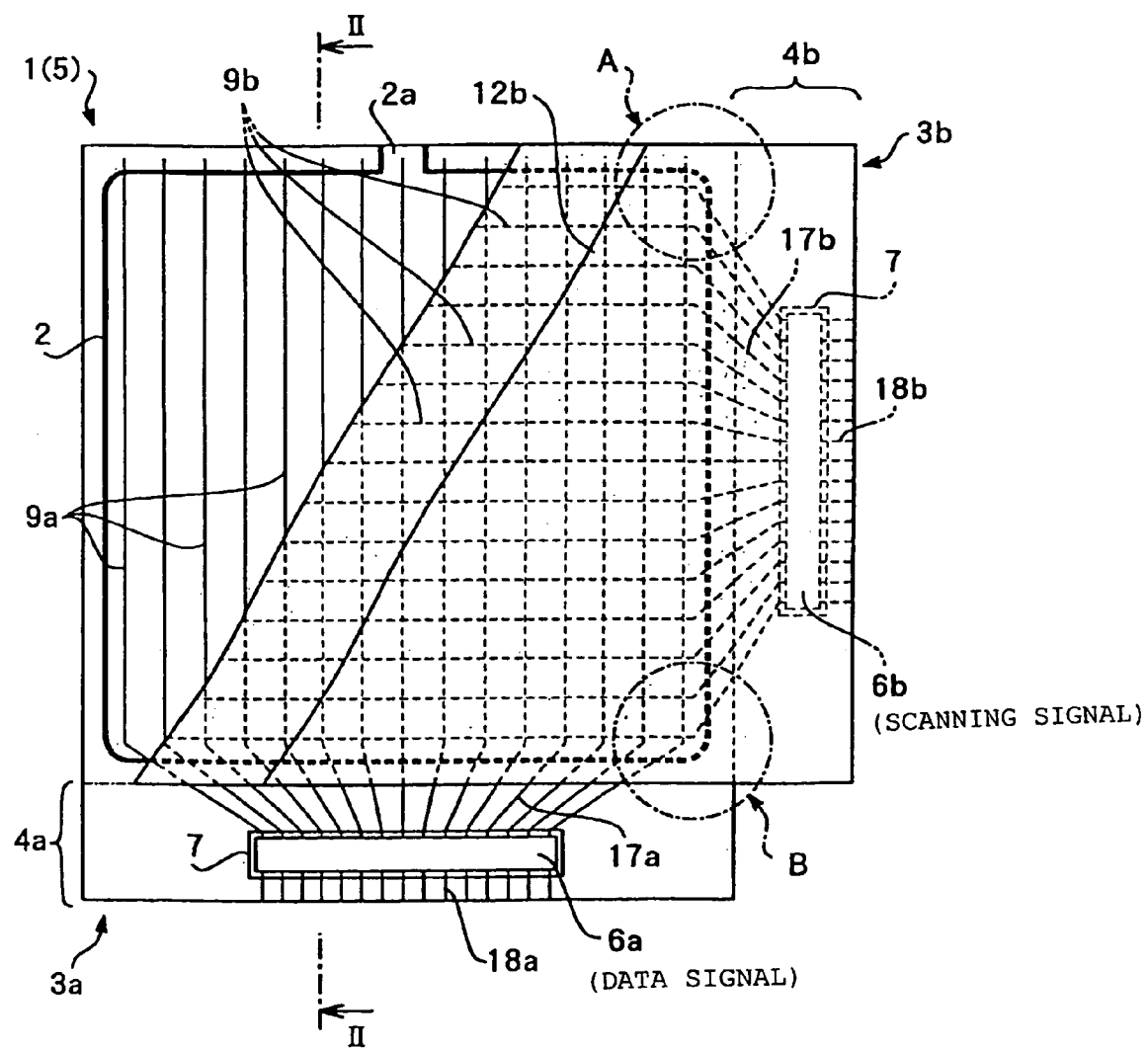

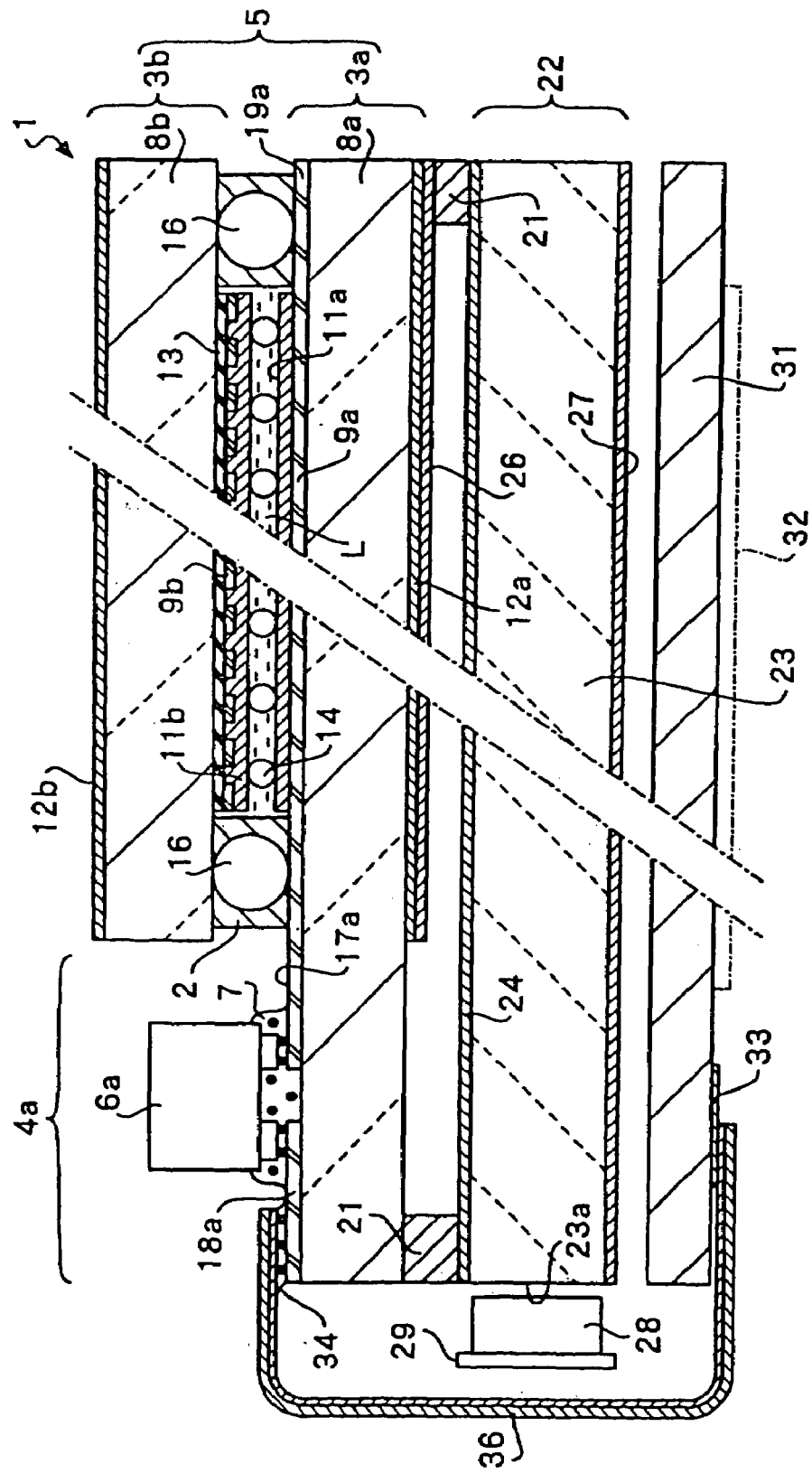
[FIG. 2]

[FIG. 3]
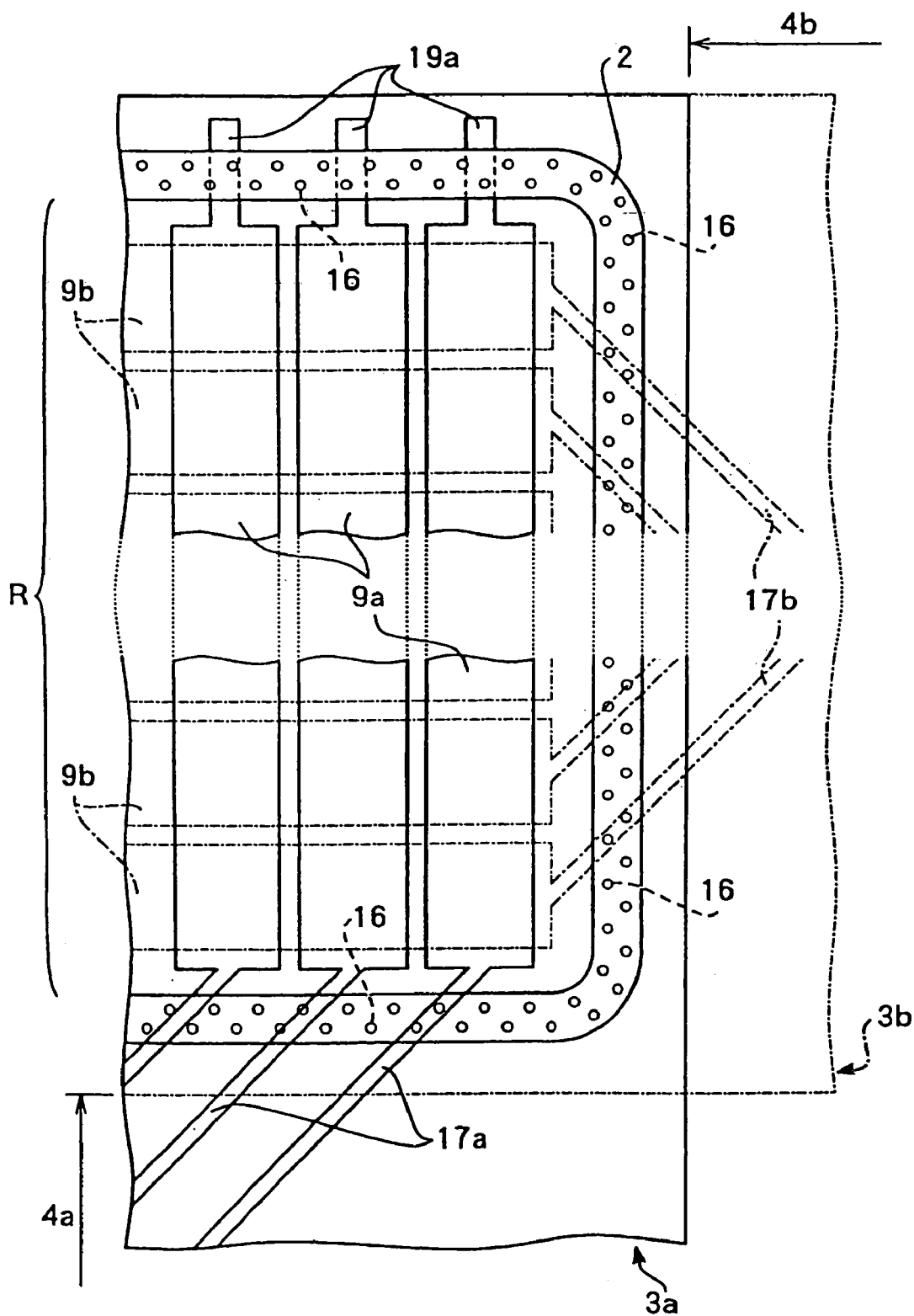

[FIG. 4]
(a)
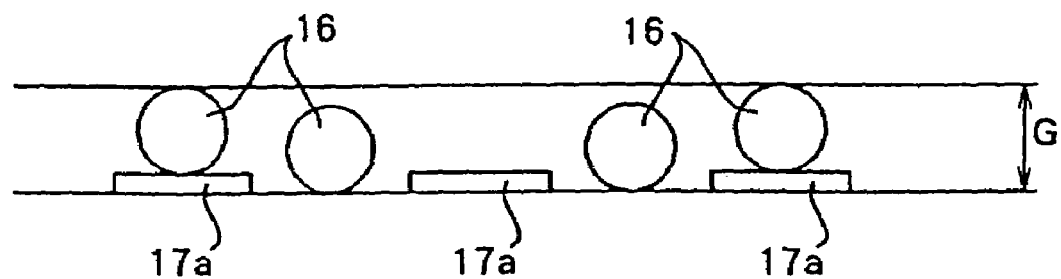
(b)
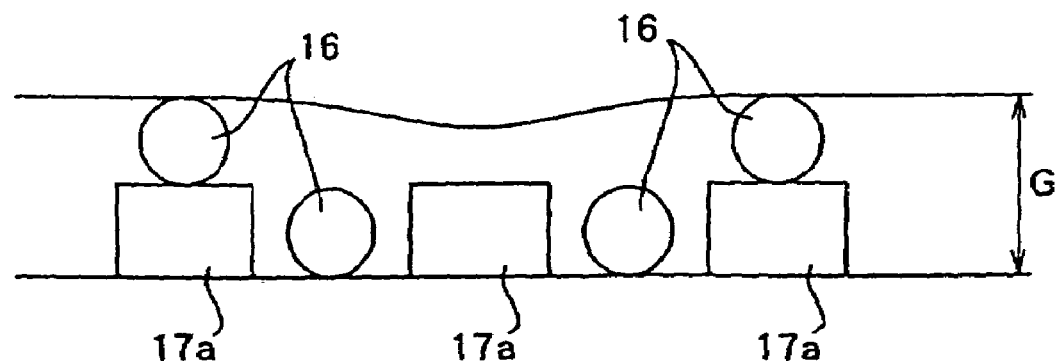

[FIG. 5]
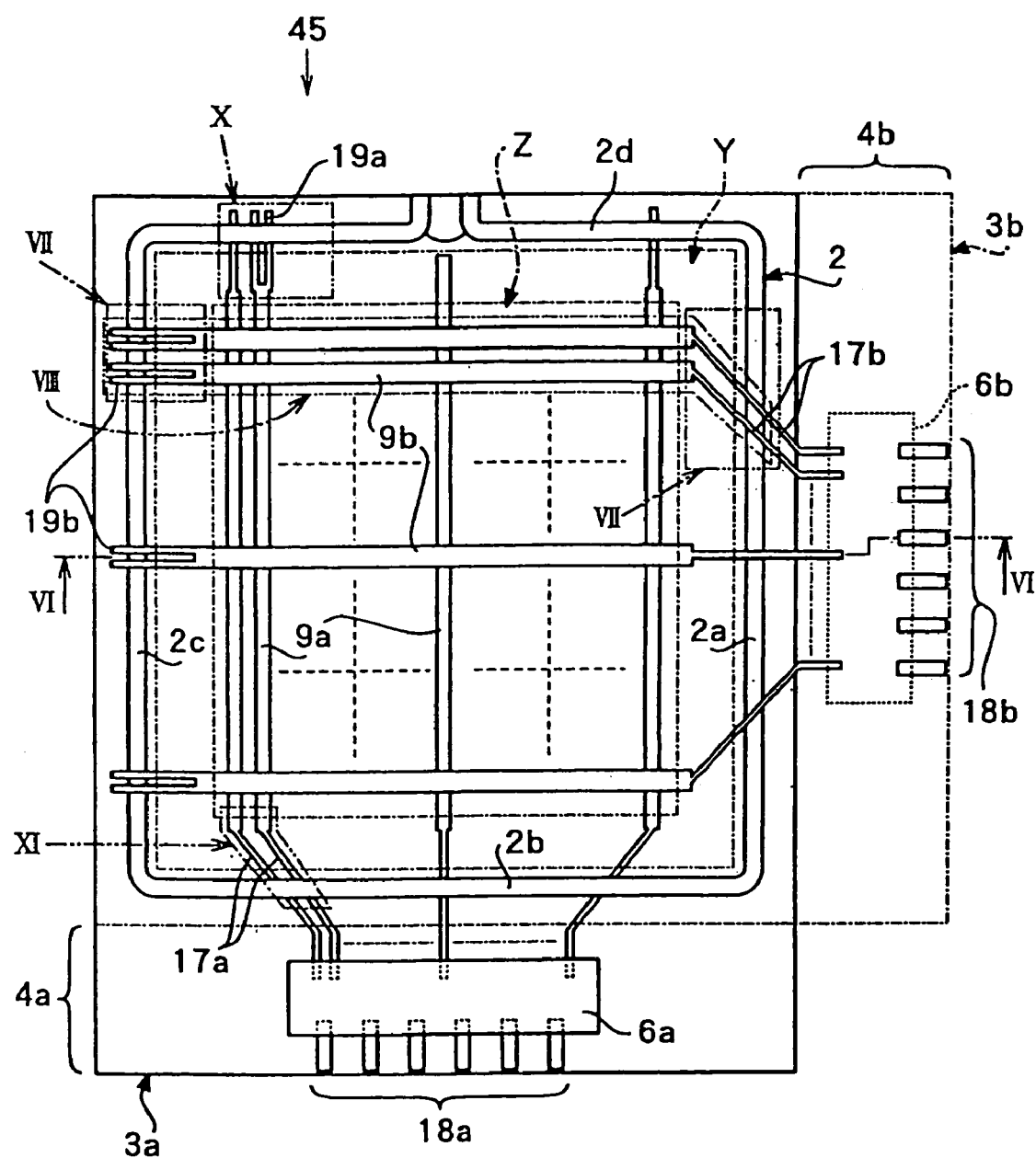

[FIG. 6]
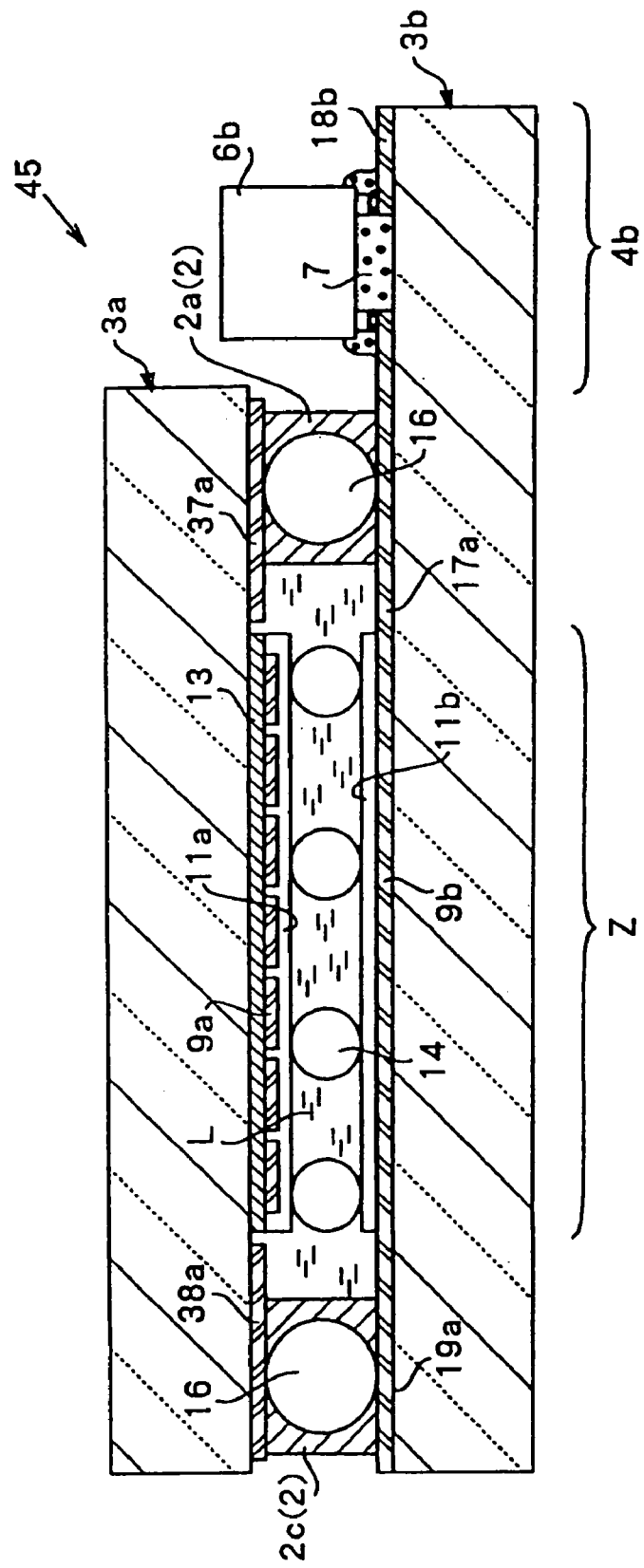

[FIG. 7]
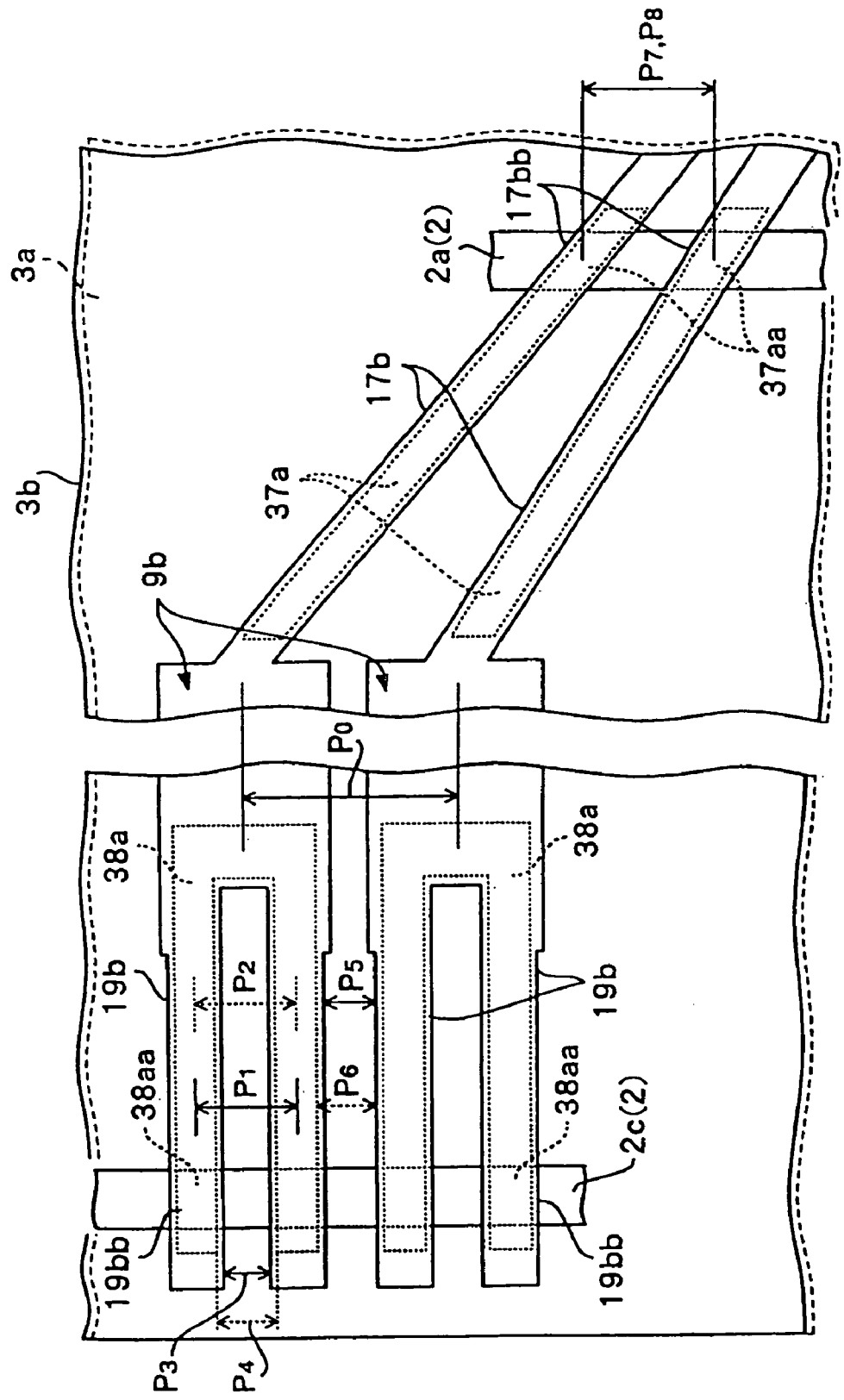

[FIG. 8]
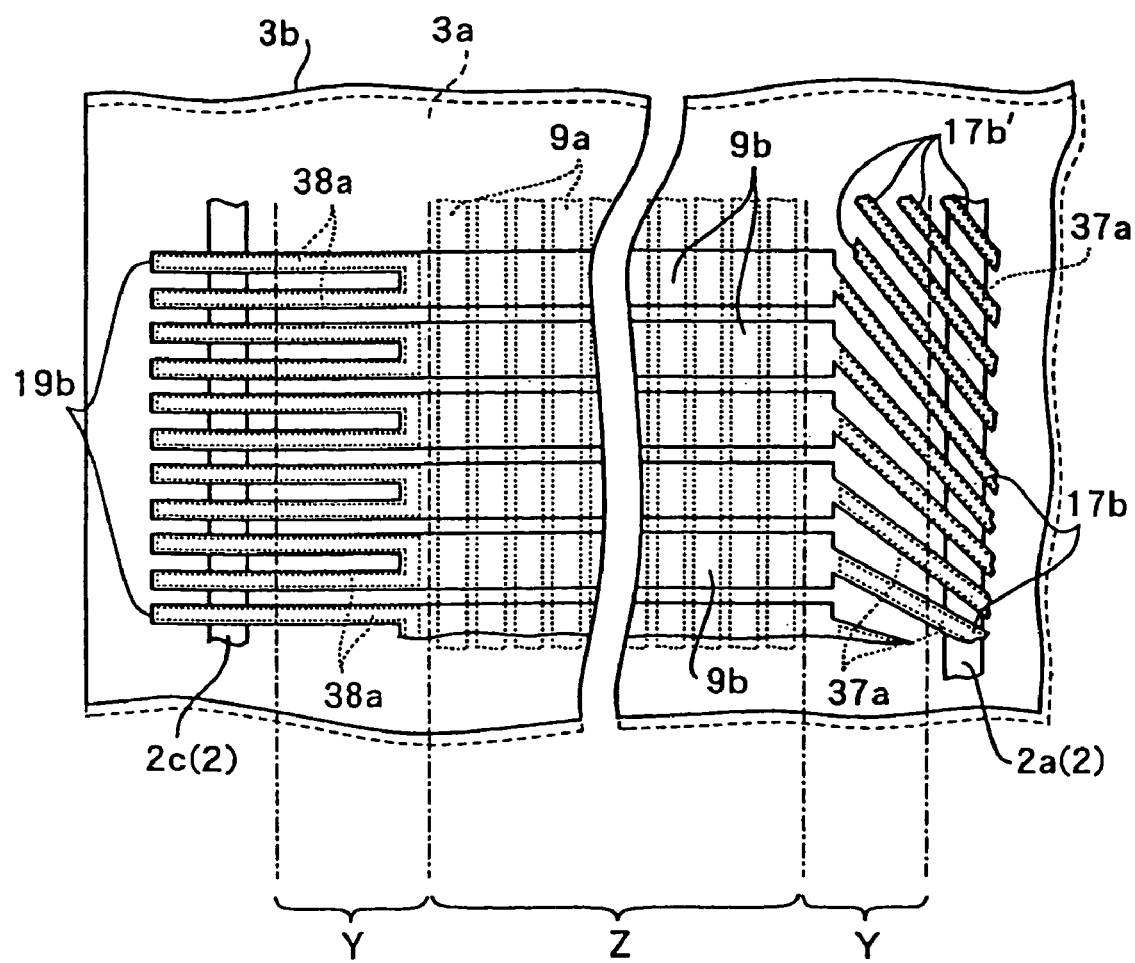

[FIG. 9]
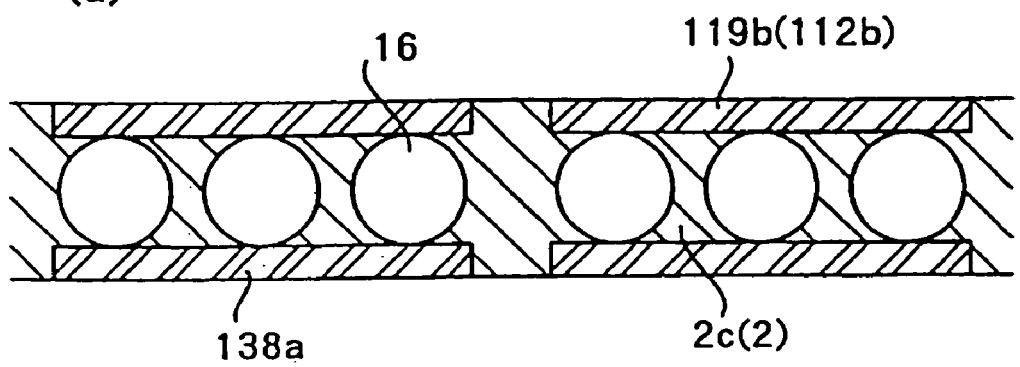
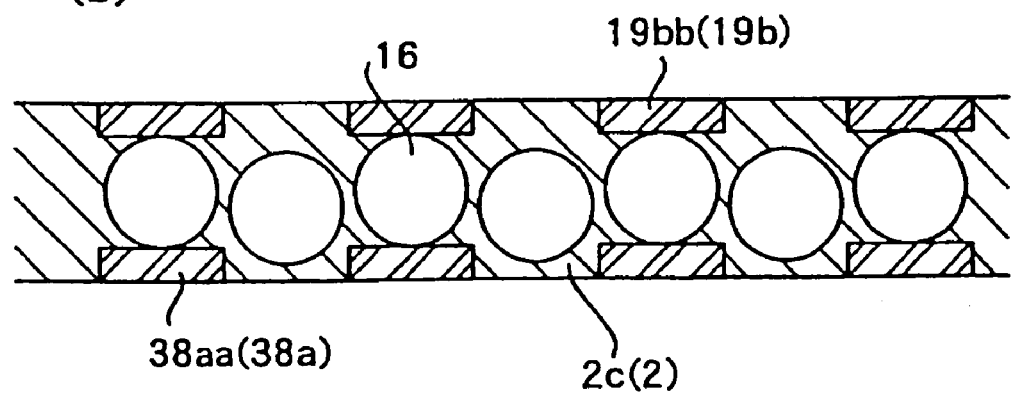

[FIG. 10]
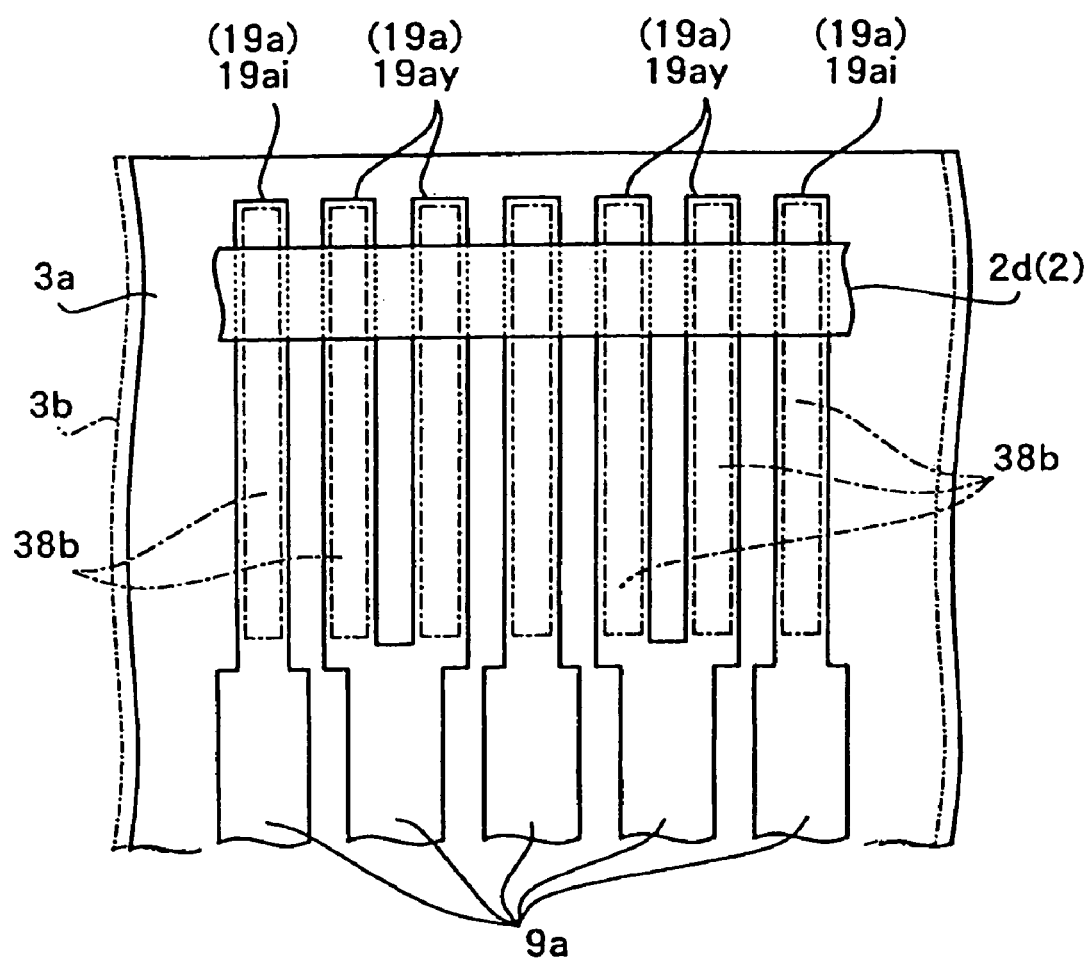

[FIG. 11]
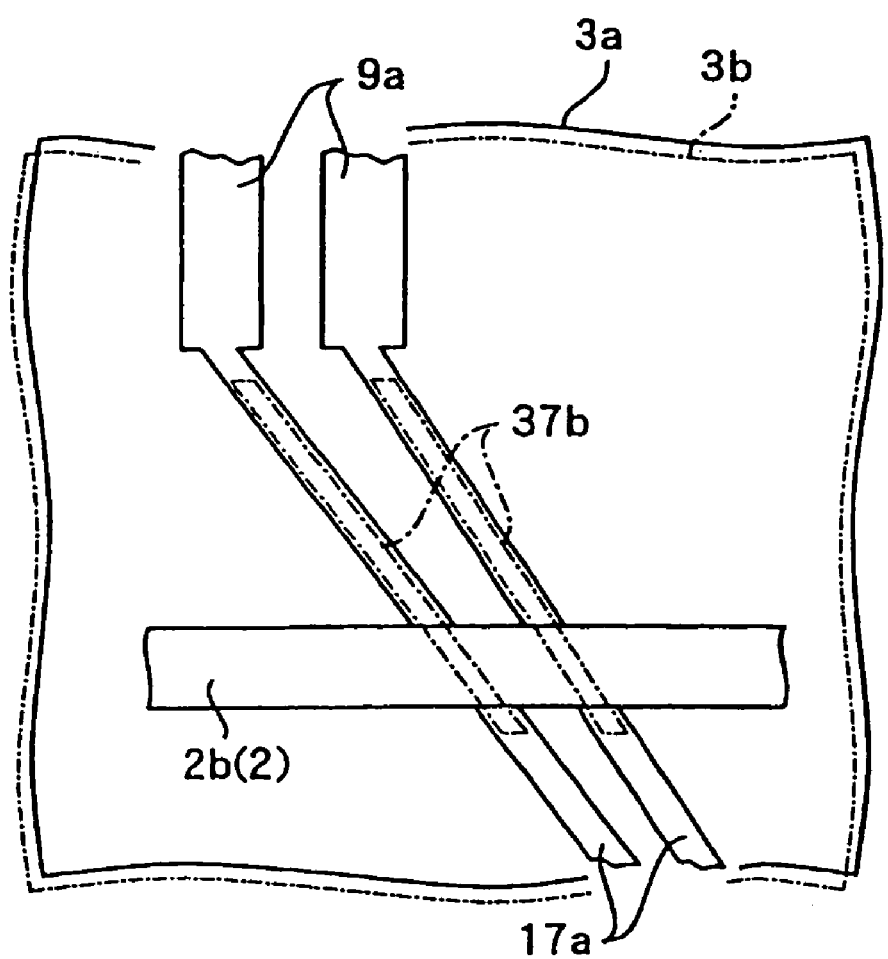

[FIG. 12]
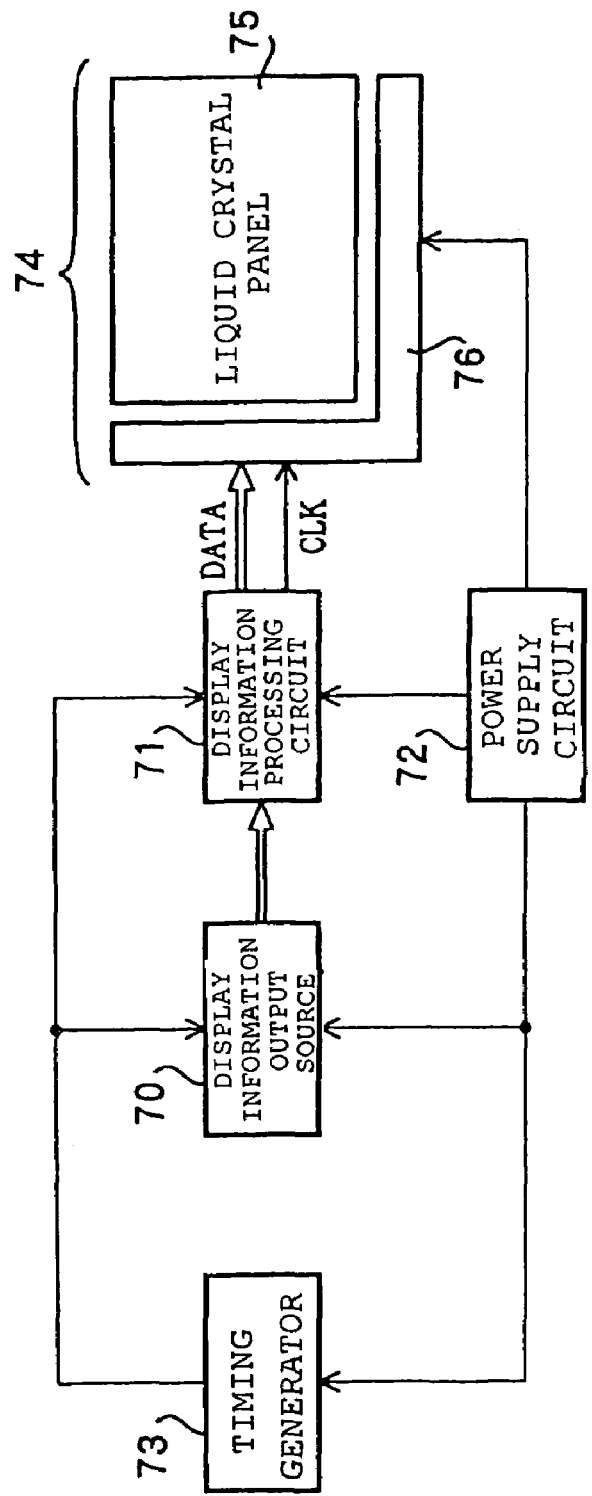

[FIG. 13]
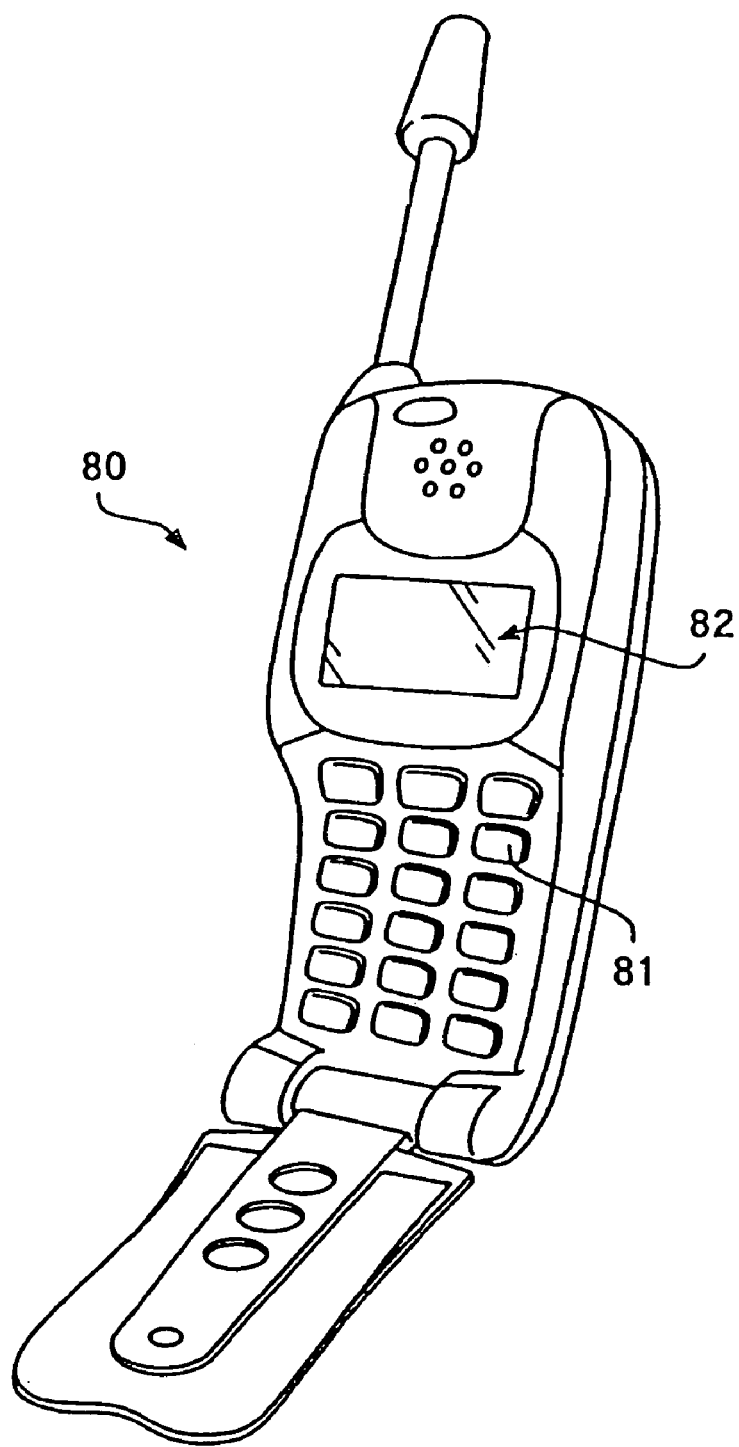

[FIG. 14]
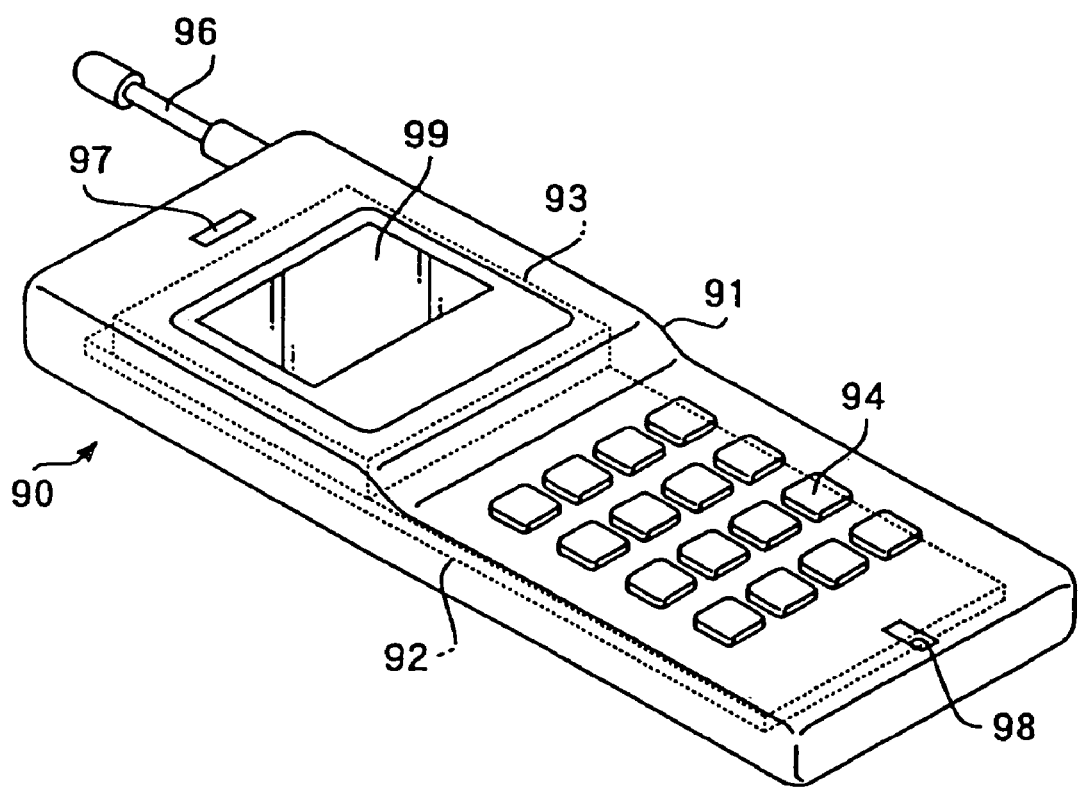

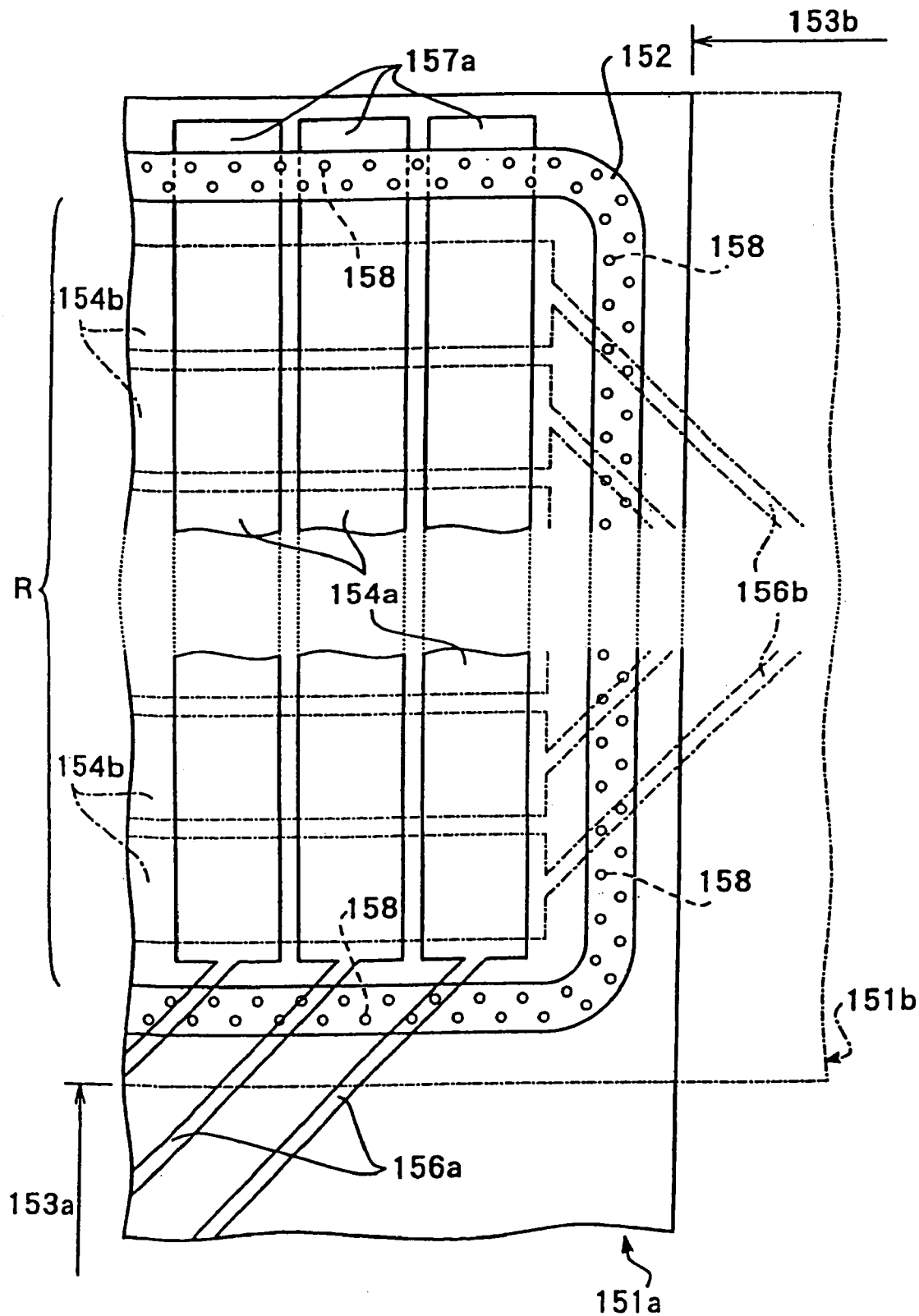
[FIG. 15]
PRIOR ART

[FIG. 16]
PRIOR ART
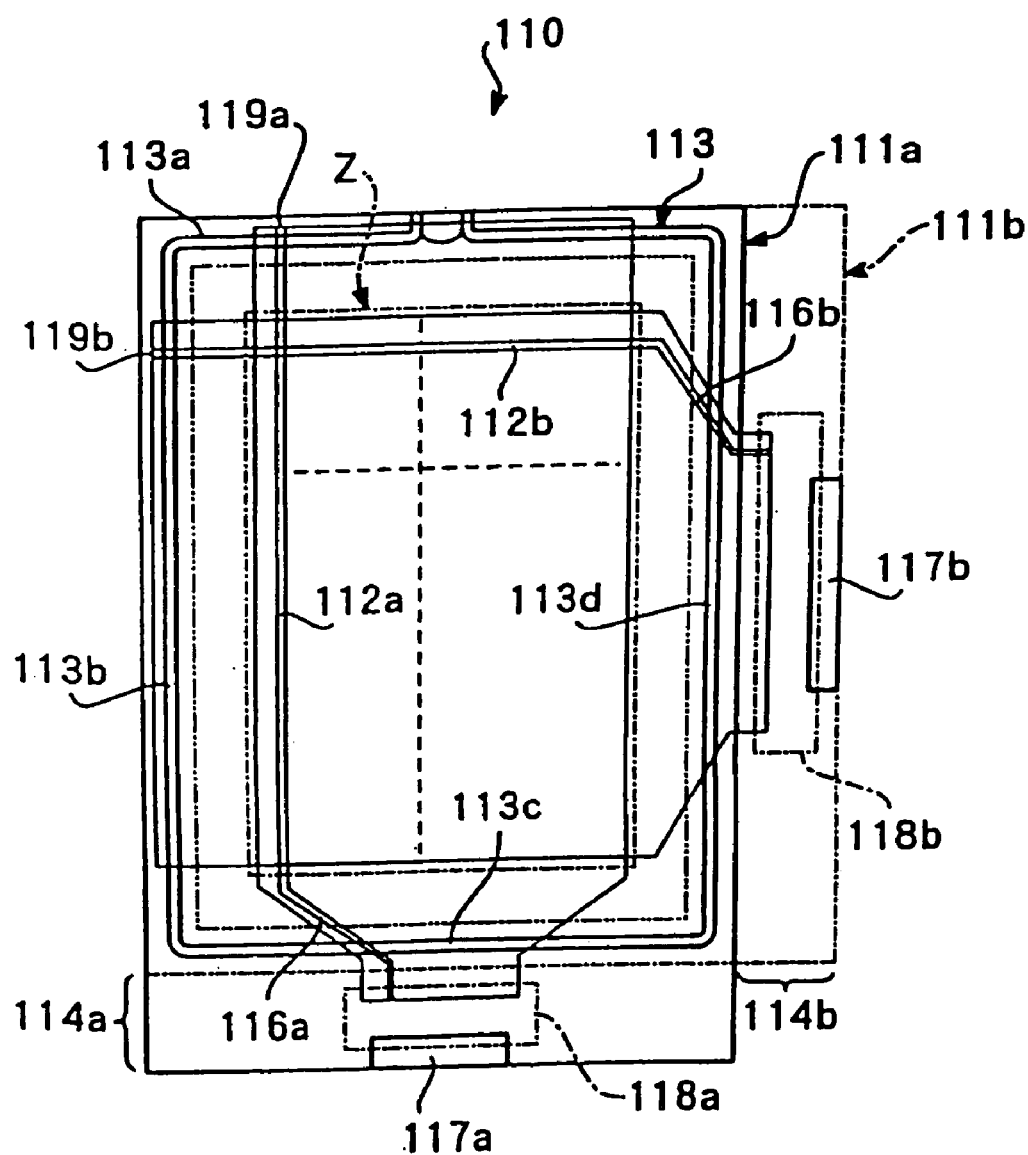

[FIG. 17]
PRIOR ART
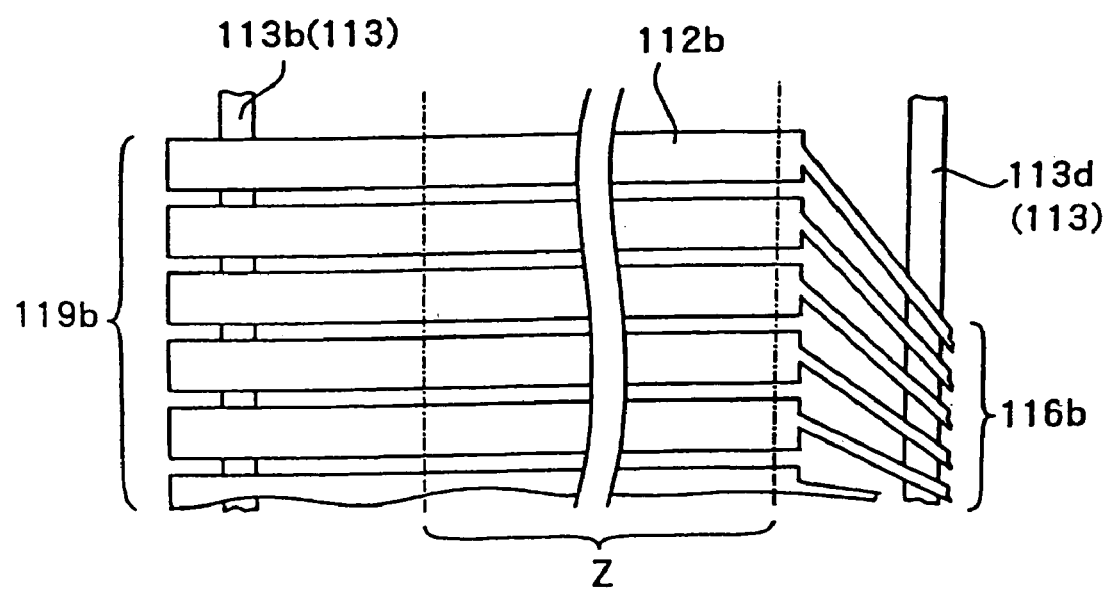

US 7,088,416 B2

LIQUID CRYSTAL DEVICE HAVING PRONGED DUMMY ELECTRODES AND ELECTRONIC DEVICE

CROSS REFERENCE TO RELATED APPLICATIONS

This application is a divisional application of U.S. Ser. No. 09/951,356 filed Sep. 13, 2001, now U.S Pat. No. 6,774,968, claiming priority to Japanese Application Nos. 2001-260110 filed Aug. 29, 2001, 2001-064069 filed Mar. 7, 2001 and 2000-280807 filed Sep. 14, 2000, all of which are hereby incorporated by reference.

TECHNICAL FIELD

The present invention relates to a liquid crystal device which forms text images and so on by using liquid crystal to modulate light and to an electronic apparatus which is formed using the liquid crystal device.

BACKGROUND ART

Recently, liquid crystal devices have been widely used in display units of electronic apparatuses such as portable computers, mobile telephones, video cameras, and so on. In general, these liquid crystal devices are formed such that a pair of substrates, each having electrodes formed thereon are bonded by a ring of sealing material such that the electrodes are oriented parallel to each other, and the liquid crystal is encapsulated in the region enclosed by the pair of substrates and the sealing material. In these liquid crystal devices, images such as text, numerals, graphics, and so on are displayed by controlling the orientation of the liquid crystal encapsulated between the pair of substrates at each pixel.

Among these liquid crystal devices, there are simple matrix liquid crystal devices which do not use active elements and active matrix liquid crystal devices which use active elements. TFD (Thin Film Diode) elements, which are two-terminal active devices, and TFT (Thin Film Transistor) elements, which are three-terminal active devices, are known as such active elements.

Conventionally, as shown in FIG. 15, for example, simple matrix liquid crystal devices which are formed such that a pair of substrates 151a and 151b made of glass or the like are bonded by a ring of sealing material 152 made of an epoxy resin or the like are known. The first one of the substrates, substrate 151a, has a substrate projecting part 153a which projects further outside than the other substrate 151b, and the other substrate 151b has a substrate projecting part 153b which projects further outside than the first substrate 151a.

A plurality of strip-shaped electrodes 154a are formed of, for example, ITO (Indium Tin Oxide) on the inside surface of the first substrate 151a, and a plurality of strip-shaped electrodes 154b are formed of, for example, ITO on the inside surface of the other substrate 151b. When the pair of substrates 151a and 151b are bonded, these electrodes 154a and 154b orthogonally intersect each other, and each intersection point forms one pixel.

The electrodes 154a formed on the first substrate 151a have wiring lines 156a which extend onto the substrate projecting part 153a by passing through the sealing material 152, and, at the same time, also have dummy patterns 157a which pass through the sealing material 152 at the side opposite to the substrate projecting part 153a. Electrodes 154b are also formed on the other substrate 151b in the same way. Liquid crystal driving ICs (Integrated Circuits; not shown in the drawing) are mounted on the substrate projecting parts 153a and 153b, and the wiring lines 156a of the electrodes 154a and the wiring lines 156b of the electrodes 154b are connected to the terminals of these liquid crystal driving ICs.

Liquid crystal is encapsulated in the region enclosed by the substrate 151a, the substrate 151b, and the sealing material 152. This region is called a liquid crystal encapsulating region R. By controlling the voltage applied to this liquid crystal at each pixel, defined by the intersection points of the electrodes 154a and the electrodes 154b, light which is incident from outside the substrate 151a or the substrate 151b and transmitted therethrough is modulated at each pixel, and, accordingly, an image such as text is displayed on the outer side of the substrate 151a or the substrate 151b.

In the conventional liquid crystal device, if a structure in which the wiring lines 156a pass underneath the sealing material 152 at the substrate projecting part 153a side while, on the other hand, the electrodes 154a do not pass underneath the sealing material 152 at the side opposite the substrate projecting part 153a is used, since the cell thickness at the end of the liquid crystal panel at the side opposite the substrate projecting part 153a becomes smaller by an amount equal to the part having no electrodes 154a, the cell thickness between the substrate projecting part 153a side and the side opposite thereto becomes nonuniform. When such a nonuniformity in the cell thickness occurs, the threshold voltage Vth at which the liquid crystal is turned ON/OFF becomes nonuniform between the substrate projecting part 153a side and the side opposite thereto, and, for that reason, a problem occurs in that the display quality of the liquid crystal device is reduced.

In the conventional liquid crystal device, the reason why the dummy patterns 157a, which pass underneath the sealing material 152 at part of the electrodes 154 positioned at the side opposite to the substrate projecting part 153a, are formed is that they prevent the height of the liquid crystal encapsulating region R, that is to say, the cell gap height, or in other words, the cell thickness, between the substrate projecting part 153a side and the side opposite thereto from becoming nonuniform.

However, in the conventional liquid crystal device in which the dummy patterns 157a are provided as described above, the configuration is such that the dummy patterns 157a are formed by extending the electrodes 154a while maintaining their width, and that is why the width of the dummy patterns 157a is the same as the width of the electrodes 154a. Accordingly, the ratio of the area underneath the sealing material 152 occupied by the wiring lines 156a, which pass through the sealing material 152 at the substrate projecting part 153a side, is different from the ratio of the area underneath the sealing material 152 occupied by the dummy patterns 157a, which pass through the sealing material 152 at the side opposite the substrate projecting part 153a. In particular, the ratio of the area occupied by the dummy patterns 157a at the side opposite the substrate projecting part 153a is larger.

Generally, in order to maintain the cell thickness at the sealing material, spherical or cylindrical spacers 158 are dispersed therein. However, when the ratio of the area occupied by the wiring lines 156a and the ratio of the area occupied by the dummy patterns 157a differ from each other, the number of spacers 158 sitting on top of the wiring lines 156a is not the same as the number of spacers 158 sitting on top of the dummy patterns 157a. In particular, the number at the substrate projecting part 153a side, where the area occupation ratio is small, is smaller than the number at the dummy pattern 157a side, where the area occupation ratio is large.

There is a tendency for the spacers 158 in the sealing material 152 to be compressed and crushed by the pair of substrates 151a and 151b; however, compared to the large number of spacers sitting on the dummy pattern 157a, where the area occupation ratio is large, the small number of spacers 158 sitting on the wiring lines 156a, where the area occupation ratio is small, are crushed to a greater extent. Accordingly, when the extent to which the spacers 158 are crushed at the two sides of the liquid crystal panel is different, a nonuniformity in the cell thickness occurs between one side of the liquid crystal panel and the other side, even when the dummy patterns 157a are formed. As a result, there is a problem in that the display quality deteriorates due to nonuniformity in the threshold voltage Vth.

Among liquid crystal devices, those having a structure in which liquid crystal driving ICs are directly mounted on the substrate projecting parts by the so-called COG (Chip On Glass) method are known. In these COG-method liquid crystal devices, since the plurality of electrodes which form the liquid crystal display region must be made to converge towards the terminals of the liquid crystal driving ICs on the substrate projecting parts, the wiring lines 156a of the electrodes 154a shown in FIG. 15 must be formed more finely, that is to say, with a narrower pattern width.

As a result, when the pattern width at one side becomes narrower, the extent to which the above-described spacers 158 are crushed becomes even more pronounced. Moreover, since the electrical resistance correspondingly increases when the pattern width becomes narrower, in order to prevent this, it is necessary to reduce the electrical resistance by increasing the pattern height, that is to say, by increasing the film thickness of the electrode. Increasing the film thickness of the electrode in this way causes the cell thickness nonuniformity due to the different level of crushing of the spacers 158 in the sealing material to become more pronounced.

In addition, in recent years there has been an increasing demand for liquid crystal devices capable of high-definition display and color display. In order to achieve these types of displays, the electrodes 154a and 154b shown in FIG. 15 must be made even more finely and the number of these electrodes must be increased. Such a decrease in the electrode width means that the film thickness must be increased, as described above, and as a result, the difference in the level of crushing of the spacers 158 in the sealing material induces a large cell thickness nonuniformity.

Moreover, a conventional liquid crystal device which uses a simple-matrix-type liquid crystal panel 110 shown in FIG. 16 is known. In this liquid crystal panel 110, a first substrate 111a and a second substrate 111b, which are made from glass, plastic, or the like, are bonded by a sealing material 113. Here, the structure is such that spherical or cylindrical spacers which have a diameter on the order of 5 to 10 μm and which are made from, for example, resin are mixed in the sealing material 113 and the spacing between the substrates is controlled by the spacers when the first substrate 111a and the second substrate 111b are joined together during substrate bonding, thus allowing the spacing between the substrates to be precisely set to a fixed value.

In the liquid crystal panel 110, a plurality of strip-shaped first electrodes 112a are arranged in parallel to each other to extend in a predetermined direction on the surface of the first substrate 111a, that is to say, in the form of stripes. Also, on the surface of the second substrate 111b, a plurality strip-shaped second electrodes 112b are arranged in parallel to each other to extend in the direction orthogonal to the first electrodes 112a, that is to say, in the form of stripes. Then, a driving region Z is formed by horizontally and vertically arraying the regions where the first electrodes 112a and the second electrodes 112b, which are formed on the surfaces of the substrates 111a and 111b, respectively, intersect each other, that is to say, pixel regions, in the shape of a matrix.

The first substrate 111a has a substrate projecting part 114a which projects further towards the outside than the second substrate 111b. Also, the second substrate 111b has a substrate projecting part 114b which projects further towards the outside than the first substrate 111a. First wiring lines 116a which are electrically connected to the first electrodes 112a pass through the region where the sealing material 113 is formed and are led out onto the substrate projecting part 114a. Also, second wiring lines 116b which are electrically connected to the second electrodes 112b pass through the region where the sealing material 113 is formed and are led out onto the substrate projecting part 114b.

Input terminals 117a and 117b are formed at the outer edges of the substrate projecting parts 114a and 114b, respectively. In addition, IC chips 118a and 118b, which are formed of semiconductor ICs, are mounted at the ends of the first wiring lines 116a and second wiring lines 116b and at the ends of the input terminals 117a and 117b.

At the opposite side from the first wiring lines 116a, the first electrodes 112a have extended dummy patterns 119a which extend outside the driving region Z. Also, at the opposite side from the second wiring lines 116b, the second electrodes 112b have extended dummy patterns 119b which extend outside the driving region Z. The extended dummy patterns 119a are connected to the first electrodes 112a, and the extended dummy patterns 119b are connected to the second electrodes 112b.

The extended dummy patterns 119a are formed such that they pass through a part 113a of the sealing material 113, and the extended dummy patterns 119b are formed such that they pass through a part 113b of the sealing material 113. The reason for forming such a structure is as follows. The first wiring lines 116a pass through a part 113c provided towards the substrate projecting part 114a side of the sealing material 113. In addition, the second wiring lines 116b pass through a part 113d provided towards the substrate projecting part 114b side of the sealing material 113. In this state, if the extended dummy patterns 119a do not pass through the part 113a provided at the side of the sealing material 113 opposite to the substrate projecting part 114a, and furthermore if the extended dummy patterns 119b do not pass through the part 113b provided at the side of the sealing material 113 opposite to the substrate projecting part 114b, the spacing between the substrates at the positions of the parts 113c and 113d will be larger than that at the parts 113a and 113b by an amount equal to the thickness of the first wiring lines 116a and second wiring lines 116b, respectively. The reason why the extended dummy patterns 119a and extended dummy patterns 119b are formed such that they pass through the part 113a and the part 113b of the sealing material 113, respectively, is to prevent such a nonuniformity in the substrate spacing.

Therefore, by providing a structure such that the extended dummy patterns 119a and 119b pass through the parts 113a and 113b, respectively, of the sealing material 113 in the manner described above, the nonuniformity in the substrate spacing in the driving region due to each of the parts 113a, 113b, 113c, and 113d of the sealing material 113 can be reduced. Such a nonuniformity in the substrate spacing causes display nonuniformity due to differences in the liquid crystal threshold voltage. The deterioration in display quality is particularly pronounced in STN (Super Twisted Nematic) type liquid crystal display devices which are sensitive to changes in the substrate spacing.

However, for the reasons given below, it is difficult to reduce the difference between the substrate spacing at the parts 113$d$ and 113$c$ of the sealing material 113 and the substrate spacing at the parts 113$b$ and 113$a$ of the sealing material 113 to a degree which makes it possible to provide sufficiently high image quality in the liquid crystal device.

For example, as shown in FIG. 17, in order to form a row of terminals for the IC chip 118$b$ (see FIG. 16), the width of the second wiring lines 116$b$ is set to be narrower than the width of the second electrodes 112$b$. In addition, the array spacing of the second wiring lines 116$b$, that is to say, the spacing at which they are formed, or in other words, the pitch, is also set to be narrower than the array spacing of the second electrodes 112$b$. Accordingly, the extended dummy patterns 119$b$ are formed with a width and an array spacing which are substantially the same as the second electrodes 112$b$. Because of this, the area occupation ratio of the second wiring lines 116$b$ with respect to the part 113$d$ of the sealing material 113 (in other words, the ratio of area occupied by the portions of the second wiring lines 116$b$ which pass through the sealing material with respect to the area of the part 113$d$) is smaller than the area occupation ratio of the extended dummy patterns 119$b$ with respect to the part 113$b$ of the sealing material 113 (in other words, the ratio of area occupied by the portion of the extended dummy patterns 119$b$ which pass through the sealing material with respect to the area of the part 113$b$).

For that reason, the number of spacers sitting on the second wiring lines 116$b$ at the part 113$d$ is less than the number of spacers sitting on the extended dummy patterns 119$b$ at the part 113$b$, and, as a result, the bonding pressure applied during substrate bonding is borne by the part 113$d$. When this happens, a difference in substrate spacing between the part 113$d$ and at the part 113$b$ remains due to the difference in the degree of crushing of the spacers. The situation is exactly the same for the first electrodes 112$a$ in FIG. 16.

Recently, there have been many demands for liquid crystal devices having high-definition display and color display capabilities. In realizing these types of display, it is necessary to increase the number of first electrodes 112$a$ and second electrodes 112$b$ by making their width smaller, and in this case the width of the electrodes becomes smaller. Since the electrical resistance increases as a result of reducing the electrode width in this way, it is necessary to form the first electrodes 112$a$ and the second electrodes 112$b$ with a larger thickness in order to prevent such an increase in electrical resistance. In this case, the first wiring lines 116$a$ and the extended dummy patterns 119$a$, which are formed at the same time as the first electrodes 112$a$, as well as the second wiring lines 116$b$ and the extended dummy patterns 119$b$, which are formed at the same time as the second electrodes 112$b$, also become thicker. Therefore, since the difference in the controlled force applied to the spacers with respect to the substrate spacing both in the case where the spacers sit on the wiring lines and the dummy patterns and in the case where they do not, increases, the difference in the amount of crushing of the spacers becomes larger, and, as a result, the nonuniformity in substrate spacing also becomes larger.

Furthermore, in liquid crystal devices having high-definition display and color display capabilities, the number of connection terminals of the IC chips increases corresponding to increases in the number of pixels and the number of electrodes, and, likewise, there is also a tendency for the spacing between terminals, that is to say, the terminal pitch, to be reduced. Therefore, the ratio of the width and array spacing, that is to say, the pitch, between the first electrodes 112$a$ and the first wiring lines 116$a$ in the driving region Z, as well as the ratio of the width and the pitch between the second electrodes 112$b$ and the second wiring lines 116$b$ also have a tendency to increase. As a result, the nonuniformity in substrate spacing also increases.

In Japanese Utility Model Application Publication No. 4-087822, there is disclosed a technology wherein, in a liquid crystal display panel which has a pair of glass substrates bonded by a sealing material, when the electrode width is changed at the location of the sealing portion, indentations and projections are prevented from occurring on the substrate surface corresponding to the sealing portion by forming dummy electrode patterns at the sealing portion. However, the dummy electrode patterns disclosed in that document are provided at the location of the sealing portion, and, as a result, it is difficult to make the cell gap uniform over a wide area of the liquid crystal panel.

In Japanese Patent Application Publication No. 5-203966, there is disclosed a technology wherein, in a color liquid crystal electrooptical device which is formed by bonding a color filter substrate and a transparent substrate via a sealing portion, by providing separate transparent electrode patterns as driving electrode patterns at the sealing portion, the cell gap is made more uniform than in the case in which portions where there are transparent electrodes and portions where there are no transparent electrodes both exist at the position where the sealing portion is provided. However, with the technology disclosed in that document, the electrode patterns for ensuring uniformity of the cell gap are provided linearly along the sealing material rather than being provided connected to the driving electrode patterns which pass through the sealing portion. As a result, it is difficult to make the cell gap uniform over a wide area of the liquid crystal panel.

SUMMARY OF THE INVENTION

The present invention is made in consideration of the problems mentioned above and its objective is to reduce the nonuniformity in substrate spacing, in other words, to reduce the cell thickness nonuniformity of a liquid crystal panel, by means of patterns of electrodes which are formed on the surfaces of the substrates which make up the liquid crystal device, thereby improving the liquid crystal display quality. In particular, the objective of the present invention is to make the cell thickness uniform over a wide region of the liquid crystal panel.

(1) In order to accomplish the above objective, a liquid crystal device according to the present invention comprises a pair of substrates which are bonded by a sealing material and a driving region which is formed inside the sealing material, and comprises a liquid crystal layer which is disposed between the pair of substrates and is surrounded by the sealing material; spacers which are dispersed in the sealing material; and electrodes, provided on the liquid crystal layer side of one of the substrates, including portions forming the driving region, wiring lines which overlap the sealing material at one side of the driving region while supplying a potential to the portions forming the driving region, and dummy patterns which overlap the sealing material at the other side of the driving region while being connected to the portions forming the driving region, wherein the width of the dummy patterns at a region overlapping the sealing material is smaller than the width of the portions forming the driving region.

In the liquid crystal device having this structure, since the wiring lines cross over one side of the sealing material and the dummy patterns cross over the other side of the sealing material, compared to the case in which the wiring lines cross over only one side of the sealing material, the substrate spacing, that is to say, the cell gap, can be kept uniform. Furthermore, since the width of the dummy patterns is made smaller than the width of the electrodes forming the driving region, the cell gap at the wiring line side and the cell gap at the dummy pattern side can be kept precisely uniform, even when the width of the wiring lines which extend outside the sealing material are formed smaller than the width of the electrodes forming the driving region.

(2) In the liquid crystal device according to the present invention, the width of the wiring lines at a region overlapping the sealing material may be smaller than the width of the portions forming the driving region.

In the liquid crystal device having the structure described in (1) above, the dummy patterns are made smaller than the width of the electrodes forming the driving region. Accordingly, in the liquid crystal device having the structure described in (2) above, the widths of both the wiring lines and the dummy patterns are made smaller than the width of the electrodes forming the driving region.

If the width of the wiring lines is made small, the wiring lines can be squeezed into a small area, even when the overall width of the driving region is large. Additionally, with the reduced width of the wiring lines, since the width of the dummy patterns can also be reduced, the cell gap at the wiring line side and the cell gap at the dummy pattern side can be kept precisely uniform.

(3) In the liquid crystal device according to the present invention, second dummy patterns may be provided on the liquid crystal layer side of the other one of the substrates so as to overlap the dummy patterns. Accordingly, if a pair of dummy patterns is provided so as to oppose each other on both substrates, the cell gap can be controlled and maintained even more precisely compared to the case where the dummy patterns are provided at only one side.

(4) In liquid crystal device according to the present invention, the width and spacing of the dummy patterns may be substantially the same as the width and spacing of the wiring lines. Accordingly, the liquid crystal panel cell gap from the dummy patterns to the wiring lines can be kept uniform even more precisely.

(5) In liquid crystal device according to the present invention, the width and the spacing of the dummy patterns may be made substantially the same as the width and spacing of the wiring lines by adjusting the width of the dummy patterns by forming a step in the sides of the dummy patterns. By adjusting the width of the dummy patterns by forming a step in this way, the adjustment can be carried out precisely.

(6) Next, a liquid crystal device according to the present invention comprises a pair of substrates which are bonded by a sealing material and a driving region which is formed inside the sealing material, and comprises a liquid crystal layer which is disposed between the pair of substrates and is surrounded by the sealing material; spacers which are dispersed in the sealing material; and electrodes, provided on the liquid crystal layer side of one of the substrates, including portions forming the driving region, wiring lines which overlap the sealing material at one side of the driving region while supplying a potential to the portions forming the driving region, and dummy patterns which are disposed at the other side of the driving region while being connected to the portions forming the driving region; wherein the dummy patterns have a plurality of split parts which are formed by splitting the tip of the electrodes; the plurality of split parts overlap the sealing material; and the width of each split part is smaller than the width of the respective portion forming the driving region.

According to the liquid crystal device with this structure, since the dummy patterns are formed by splitting the ends of the electrodes, the spacing between adjacent dummy patterns can be set smaller or larger to the desired spacing. Therefore, the cell gap can be controlled and maintained even more precisely.

(7) In the liquid crystal device with the structure described above, the width of the wiring lines at the region overlapping the sealing material may be smaller than the width of the portions forming the driving region.

(8) In the liquid crystal device with the structure described above, the width and spacing of the dummy patterns may be made substantially the same as the width and spacing of the wiring lines by matching the ends of the split parts and the unsplit electrodes.

(9) Next, the liquid crystal device according to the present invention comprises a pair of substrates which are bonded by a sealing material and a driving region which is formed inside the sealing material, and comprises a liquid crystal layer which is disposed between the pair of substrates and is surrounded by the sealing materials; spacers which are dispersed in the sealing material; a plurality of electrodes, provided on the liquid crystal layer side of one of the substrates, including portions forming the driving region, wiring lines which overlap the sealing material at one side of the driving region while supplying a potential to the portions forming the driving region, and dummy patterns which are disposed at the other side of the driving region while being connected to the driving region; and an IC chip which is mounted on one of the substrates and which is connected to the wiring lines; wherein each of the wiring lines is disposed so as to converge towards the IC chip from the driving region; each of the dummy patterns comprises a plurality of split parts formed by splitting the ends of the electrodes; the plurality of split parts overlap the sealing material; and the widths and spacings of the split parts and the wiring lines are substantially the same.

(10) Next, the liquid crystal device according to the present invention comprises a pair of substrates which are bonded by a sealing material and a driving region which is formed inside the sealing material, and comprises a liquid crystal layer which is disposed between the pair of substrates and is surrounded by the sealing material; spacers which are dispersed in the sealing material; a plurality of electrodes, provided on the liquid crystal layer side of one of the substrates, including portions forming the driving region, wiring lines which overlap the sealing material at one side of the driving region while supplying a potential to the portions forming the driving region, and dummy patterns which are disposed at the other side of the driving region while being connected to the portions forming the driving region; and an IC chip which is mounted on one of the substrates and which is connected to the wiring lines; wherein the individual wiring lines are disposed so as to converge towards the IC chip from the driving region; the plurality of dummy patterns include at least one of the first parts and at least one of the second parts due to the fact that the individual dummy patterns have one of a plurality of first parts which are formed by splitting the ends of the electrodes and a second part which is formed by the end of the electrodes which are not split; the first parts and the second parts overlap the sealing material; and the combined width and spacing of the first parts and the second parts are substantially the same as the width and the spacing of the wiring lines.

(11) In the liquid crystal device with the structure described above, the widths of each of the individual first parts, the individual second parts, and the individual wiring lines may be smaller than the widths of the individual portions forming the driving region.

(12) Next, the liquid crystal device according to the present invention comprises a pair of substrates which are bonded by a sealing material and a plurality of electrodes formed on a surface of at least one of the substrates, at least one of the substrates comprising a substrate projecting part which projects outside the other substrate; wherein the plurality of electrodes includes wiring lines which pass through the sealing material and extend to the substrate projecting part, and dummy patterns which pass through the sealing material at the side opposite the substrate projecting part; and the dummy patterns are formed with a width which is smaller than the width of the electrodes which are in a portion surrounded by the sealing material.

In such a liquid crystal device, since it is possible to reduce the dimensional differences in the width of the dummy patterns and the width of the wiring lines by forming the dummy patterns to be narrower than the electrodes, the nonuniformity in the liquid crystal panel cell gap between the wiring line side and the dummy pattern side can be reduced, and, as a result, the display quality of the liquid crystal device can be improved.

(13) In the liquid crystal device with the structure described above, the area occupation ratio of portions of the dummy patterns which pass through the sealing material is substantially the same as the area occupation ratio of portions of the wiring lines which pass through the sealing material.

In the liquid crystal device having such a structure, since the status of the area with respect to the sealing material at the dummy pattern side and the status of the area with respect to the sealing material at the wiring line side are substantially the same, the cell gap nonuniformity of the liquid crystal panel can be reduced still further.

Moreover, the terms "area occupation ratio" referred to in the structure described above mean the proportion of the area of the dummy patterns passing underneath the sealing material based on the area of the electrodes passing underneath the sealing material in the case where the electrodes pass through the sealing material with their original width unchanged, the proportion of the area of the wiring lines passing underneath the sealing material based on the area of the electrodes passing underneath the sealing material in the case where the electrodes pass through the sealing material with their original width unchanged, and so on. Furthermore, the meaning of the term "substantially the same" of course includes cases which are exactly the same, but also includes cases which, although not exactly the same, differ to such an extent that there are no negative effects in terms of function.

(14) In the liquid crystal device with the structure described above, the area occupation ratio of the portions of the dummy patterns which pass through the sealing material and the area occupation ratio of the portions of the wiring lines which pass through the sealing material may each be approximately 40% or more. Accordingly, the nonuniformity in the cell thickness of the liquid crystal panel can be suppressed while, at the same time, allowing the resistance of the electrodes, or in other words, the thickness of the electrodes, to be set to an appropriate value.

(15) In the liquid crystal device with the structure described above, gap-forming material, or spacers may be included in the sealing material. According to the present invention, since the dummy patterns are formed with a width which is smaller than the width of the electrodes in the portion surrounded by the sealing material, the dimensional difference between the width of the dummy patterns and the width of the wiring lines is reduced, and therefore, the difference between the number of spacers sitting on the wiring lines and the number of spacers sitting on the dummy patterns is reduced. As a result, since there is substantially no difference in the degree of crushing of the spacers at the wiring line side and the degree of crushing of the spacers at the dummy pattern side, the nonuniformity in cell thickness of the liquid crystal panel can be reduced, and accordingly, the display quality of the liquid crystal device can be improved.

(16) In the liquid crystal device with the structure described above, an IC chip may be directly mounted on the surface of the substrate projecting part and the wiring lines may be connected to terminals of the IC chip. With this structure, the present invention is applied to a so-called COG-type liquid crystal device. In the COG-type liquid crystal device, since the plurality of electrodes inside the liquid crystal display region must be made to converge towards the terminal part of the IC chip on the substrate projecting part, the width of the individual wiring lines which pass through the sealing material must be made small. According to the present invention, if the width of the dummy patterns at the side opposite to the wiring lines is formed to be smaller than the width of the electrodes in the portion surrounded by the sealing material, it is possible to bring the width of the dummy patterns close to the width of the wiring lines at the side opposite thereto. Therefore, for a COG-type liquid crystal panel, the cell thickness can be kept uniform over a wide area.

(17) In the liquid crystal device with the structure described above, color filters may be formed on one of the surfaces of the pair of substrates, and the electrodes may be formed on one of the pair of substrates in correspondence with the individual color elements of the color filters. This structure is an application of the present invention to a liquid crystal device capable of color display.

Since the color filters are generally formed by R (red), G (green), and B (blue) individual color elements, the number of electrodes must be three times larger than in the case of a black and white monochrome display, and therefore, the width of the electrodes must be made even smaller. Reducing the thickness of the electrodes means that the electrical resistance of the electrodes increases by that amount, and in order to avoid this, the film thickness of the electrodes must be increased. Accordingly, when the film thickness of the electrodes is large, if the number of spacers sitting on the wiring lines at one end of the electrodes is different from the number of spacers sitting on the dummy patterns at the other end of the electrodes, and it means that, as a result of the difference, nonuniformity in the cell thickness easily occurs between the wiring line side and the dummy pattern side.

In the above phenomenon, as in the present invention, if the width of the dummy patterns at the side opposite the wiring lines is formed smaller than the width of the electrodes in the portion surrounded by the sealing material, since it is possible to bring the width of the dummy patterns close to the width of the wiring lines at the side opposite thereto, the number of spacers sitting on the dummy patterns can be brought close to the number of gap members sitting on the wiring lines at the side opposite thereto. Therefore, it is possible to reliably prevent the cell thickness from becoming nonuniform even in a liquid crystal panel capable of color display in which the electrode film thickness tends to be increased.

(18) In the liquid crystal device with the structure described above, stripe-shaped electrodes which orthogonally intersect each other may be formed on the pair of substrates, and the liquid crystal device may be a simple matrix type in which each of the orthogonally intersecting portions forms a pixel.

Among liquid crystal devices, there are active-matrix-type liquid crystal devices which use active elements and simple-matrix-type liquid crystal devices which do not use active elements. In the simple-matrix-type liquid crystal devices, generally, stripe-shaped electrodes which orthogonally intersect each other are formed on a pair of substrates, each intersecting portion forms one single pixel, and a plurality of the pixels are arranged in the form of a dot matrix overall. The present invention is preferably applied to such a simple-matrix-type liquid crystal device. The reason is that, in the simple-matrix-type liquid crystal device, a difference in the width of the patterns between the wiring lines at the substrate projecting side and the dummy patterns at the side opposite thereto easily occurs.

(19) Next, the electronic apparatus according to the present invention comprises a liquid crystal device and a control circuit for controlling the operation of the liquid crystal device; wherein the liquid crystal device comprises a pair of substrates bonded by a sealing material and a plurality of electrodes formed on the surface of at least one of the substrates, at least one of the substrates comprising a substrate projecting part which projects outside the other substrate; the plurality of electrodes comprises wiring lines which pass through the sealing material and extend to the substrate projecting part and dummy patterns which pass through the sealing material at the side opposite to the substrate projecting part; and the dummy patterns are formed with a width which is smaller than the width of the electrodes in a portion surrounded by the sealing material.

(20) Next, the liquid crystal device according to the present invention comprises a pair of substrates bonded by a sealing material and a plurality of electrodes formed on the surface of at least one of the substrates, a driving region being provided inside the sealing material; wherein the electrodes comprise wiring lines which pass through a part of the sealing material which is formed at one side of the driving region and are led to the outside, and dummy patterns which are on the surface of at least one of the pair of substrates and which pass through a part of the sealing material which is formed at the other side of the driving region; and the dummy patterns are formed so as to pass through the sealing material with a width and a spacing which are different from the width and the spacing of the electrodes inside the driving region.

According to this invention, by forming the dummy patterns so that they pass through the sealing material with a width and a spacing which are different from the width and the spacing of the electrodes inside the driving region, even if there is a large difference between the width and spacing of the electrodes and the width and spacing of the wiring lines, since it is possible to bring them close to the width and the spacing of the portions of the wiring lines passing through the sealing material, the difference between the area occupation ratio of the dummy patterns and the area occupation ratio of the wiring lines with respect to the sealing material is reduced, and it is possible to achieve a substrate spacing which does not widely vary along the sealing material while, at the same time, allowing the difference in substrate spacing at the portions of the sealing material at either side of the driving region to be reduced. Accordingly, the substrate spacing in the driving region can be kept uniform and the display quality can be improved.

(21) In the liquid crystal device with the structure described above, the dummy patterns may be connected to the electrodes. The dummy patterns in this structure are electrically connected to the wiring lines which form the electrodes or part of the electrodes, and are formed on the surface of one of the substrates as part of the electrodes.

(22) In the liquid crystal device with the structure described above, the dummy patterns may be at least one part of dummy patterns formed on the surface of the other substrate opposite to the electrodes.

In this structure, the dummy patterns may be electrically connected to the electrodes or the wiring lines, or alternatively, they may be independent dummy patterns which are not electrically connected to electrodes and the wiring lines. Independent dummy patterns are normally formed so as to oppose the dummy patterns which are connected to the electrodes.

In the present invention, as described above, the dummy patterns are formed for reducing the difference of the sizes of spaces formed between the substrates via sealing material. The wiring lines pass one of the spaces, and no wiring line passes the other of the spaces, and furthermore, they are provided so that the portion outside the driving region and inside the region where the liquid crystal is encapsulated by the sealing material does not appear to be very different from the driving region.

As described above, the dummy patterns may be formed on either one of the pair of substrates, or alternatively, they may be formed on both of the substrates so that the dummy patterns are oriented parallel to each other. Accordingly, even if the dummy patterns which pass through the sealing material are formed on either one of the pair of substrates, there is no change in their effect on the substrate spacing. Furthermore, when there are dummy patterns opposing the wiring lines, it is preferable for the dummy patterns to be formed so as to be oriented parallel to each other on both substrates.

(23) In the liquid crystal device with the structure described above, the dummy patterns may be formed so as to pass through the sealing material with a width and a spacing which lean more towards the width and the spacing of the wiring lines than the width and the spacing of the electrodes inside the driving region.

For example, when the width and spacing of the wiring lines are smaller than the width and spacing of the electrodes, the dummy patterns are formed so as to pass through the sealing material with a width and a spacing which are smaller than the width and the spacing of the electrodes.

According to the liquid crystal device having this structure, the difference between the substrate spacing affected by the dummy patterns passing through the sealing material and the substrate spacing affected by the wiring lines can be reduced compared to the case in which the dummy patterns are formed with the same width and spacing as the electrodes.

(24) In the liquid crystal device with the structure described above, the dummy patterns may be formed so as to pass through the sealing material with a width and a spacing which are closer to the width and the spacing of the wiring lines than the width and the spacing of the electrodes inside the driving region. More preferably, the dummy patterns are formed so as to pass through the sealing material with a width and a spacing which are substantially the same as the width and the spacing of the wiring lines.

(25) In the liquid crystal device with the structure described above, the area occupation ratio of the dummy patterns with respect to the sealing material may be formed so as to lean more towards the value of the area occupation ratio of the wiring lines with respect to the sealing material than the area occupation ratio in the case where the electrodes inside the driving region pass through the sealing material unchanged.

For example, in the case where the area occupation ratio of the wiring lines is smaller than the area occupation ratio of the electrodes when it is assumed that the electrodes are formed so as to extended and pass through the sealing material with their original, unchanged width and spacing, the dummy patterns are formed so as to pass through the sealing material with an area occupation ratio which is smaller than the area occupation ratio of the electrodes assumed above.

Accordingly, since it is possible to reduce the difference between the area occupation ratio of the dummy patterns and the area occupation ratio of the wiring lines, the difference in substrate spacing between the part in the sealing material at one side of the driving region and the part at the other side can be reduced.

(26) In the liquid crystal device with the structure described above, the area occupation ratio of the dummy patterns with respect to the sealing material may be formed so as to be closer in value to the area occupation ratio of the wiring lines with respect to the sealing material than the area occupation ratio in the case where the electrodes inside the driving region pass through the sealing material unchanged. More preferably, the area occupation ratio of the dummy patterns with respect to the sealing material is set to be substantially the same as the area occupation ratio of the wiring lines with respect to the sealing material.

In the structure described above, the term "area occupation ratio" means the proportion of the area of the parts of the wiring lines or dummy patterns which pass through the sealing material with respect to the area of the sealing material, and this area occupation ratio is set according to the width and spacing of the wiring lines or dummy patterns. More concretely, in the case where a plurality of patterns are arrayed along the sealing material, the proportion of area mentioned above means the ratio of the passing area of the pattern with respect to the total area of the sealing material in one period within those array periods. Therefore, if the array period is constant, the area occupation ratio is also constant along the sealing material; however, if the array period is not constant, the area occupation ratio varies along the sealing material.

(27) Next, a liquid crystal device according to the present invention comprises a pair of substrates bonded by a sealing material, a plurality of first electrodes formed on the surface of one of the substrates, and a plurality of second electrodes formed on the surface of the other substrate, a driving region being provided inside the sealing material; wherein the first electrodes are provided with wiring lines which pass through a part of the sealing material formed at one side of the driving region and which are led towards the outside; the second electrodes are provided with dummy patterns which pass through a part of the sealing material formed at the other side of the driving region; and the dummy patterns are formed with a width which is different from the width of the first electrodes.

According to this liquid crystal device, by forming the dummy patterns with a width which differs from the width of the first electrodes, when the width of the first electrodes and the width of the wiring lines are different, by making the width of the dummy patterns different from the width of the first electrodes, it is possible to reduce the difference between the substrate spacing at a part of the sealing material at one side of the driving region and the substrate spacing at a part of the sealing material at the other side of the driving region.

(28) In the liquid crystal device according to the present invention, the dummy patterns may be formed so as to pass through the sealing material with a width and a spacing which leans more towards the width and the spacing of the wiring lines than the width and the spacing of the first electrodes inside the driving region. For example, in the case where the width and spacing of the wiring lines are smaller than the width and spacing of the electrodes, the dummy patterns are formed so as to pass through the sealing material with a width and a spacing which are smaller than the width and the spacing of the electrodes.

(29) In the liquid crystal device with the structure described above, the dummy patterns may be formed so as to pass through the sealing material with a width and a spacing which is closer to the width and the spacing of the wiring lines than the width and the spacing of the first electrodes inside the driving region. More preferably, the dummy patterns are formed so as to pass through the sealing material with a width and a spacing which are substantially the same as the width and the spacing of the wiring lines.

(30) In the liquid crystal device with the structure described above, the area occupation ratio of the dummy patterns with respect to the sealing material may be formed so as to lean more towards the value of the area occupation ratio of the wiring lines with respect to the sealing material than the area occupation ratio when it is assumed that the electrodes inside the driving region are extended and pass through the sealing material with the original width and spacing thereof unchanged.

For example, in the case where the area occupation ratio of the wiring lines is smaller than the area occupation ratio of the electrodes when it is assumed that the electrodes formed so as to extend and pass through the sealing material with their original, unchanged width and spacing, the dummy patterns are formed so as to have an area occupation ratio which is smaller than the area occupation ratio of the electrodes assumed above.

(31) In the liquid crystal device with the structure described above, the area occupation ratio of the dummy patterns with respect to the sealing material may be formed so as to be closer in value to the area occupation ratio of the wiring lines with respect to the sealing material than the area occupation ratio when it is assumed that the electrodes inside the driving region are extended and pass through the sealing material with the original width and spacing thereof unchanged. More preferably, the area occupation ratio of the dummy patterns with respect to the sealing material is formed to be substantially the same as the area occupation ratio of the wiring lines with respect to the sealing material.

(32) Next, a liquid crystal device according to the present invention comprises a pair of substrates bonded by a sealing material, a plurality of first electrodes formed on the surface of one of the substrates, and a plurality of second electrodes formed on the surface of the other substrate, a driving region being provided inside the sealing material; wherein the first electrodes are provided with wiring lines which pass through a part of the sealing material formed at one side of the driving region and which are led towards the outside, and first dummy patterns which pass through a part of the sealing material formed at the other side of the driving region; the second electrodes are provided with third dummy patterns which oppose the wiring lines, and second dummy patterns which oppose the first dummy patterns; and the sum of the area occupation ratio of the first dummy patterns with respect to the sealing material and the area occupation ratio of the second dummy patterns with respect to the sealing material has a value which leans more towards the sum of the area occupation ratio of the wiring lines with respect to the sealing material and the area occupation ratio of the third dummy patterns with respect to the sealing material than two times the area occupation ratio when it is assumed that the first electrodes are extended and pass through the sealing material with the original width and spacing thereof unchanged.

For example, in the above assumption, in the case where the sum of the area occupation ratio of the wiring lines and the area occupation ratio of the third dummy patterns is smaller than two times the area occupation ratio of the first electrodes, the sum of the area occupation ratio of the first dummy patterns with respect to the sealing material and the area occupation ratio of the second dummy patterns with respect to the sealing material is formed so as to be smaller than two times the area occupation ratio of the first electrodes in the above assumption.

Since the liquid crystal device having the structure described above is formed such that the first electrodes and the second electrodes are each formed on the surfaces of the pair of substrates, the wiring lines and the third dummy patterns oppose each other and pass through a part in the sealing material at one side of the driving region, and the first dummy patterns and the second dummy patterns oppose each other and pass through a part in the sealing material at the other side of the driving region, the substrate spacing at the part of the sealing material at one side of the driving region is set according to the passing aspect of the wiring lines and the third dummy patterns, while the substrate spacing at the part of the sealing material at the other side of the driving region is set according to the passing aspect of the first dummy patterns and the second dummy patterns.

As described above, since the sum of the area occupation ratio of the first dummy patterns and the area occupation ratio of the second dummy patterns has a value which leans more towards the sum of the area occupation ratio of the wiring lines and the area occupation ratio of the third dummy patterns than two times the area occupation ratio of the first electrodes, compared with the case, which the dummy patterns are formed by extending the first electrodes without changing their width and the spaces between the first electrodes, and the second dummy patterns are formed in the same width and the spaces of the first electrodes, as well as the above assumption, the difference of the sizes of the spaces between the substrates is reduced.

(33) In the liquid crystal device with the structure described above, the sum of the area occupation ratio of the first dummy patterns with respect to the sealing material and the area occupation ratio of the second dummy patterns with respect to the sealing material may be closer in value to the sum of the area occupation ratio of the wiring lines with respect to the sealing material and the area occupation ratio of the third dummy patterns with respect to the sealing material than two times the area occupation ratio when it is assumed that the first electrodes are extended and pass through the sealing material with the original width and spacing thereof unchanged.

More preferably, the sum of the area occupation ratio of the first dummy patterns with respect to the sealing material and the area occupation ratio of the second dummy patterns with respect to the sealing material is set to be substantially the same as the sum of the area occupation ratio of the wiring lines with respect to the sealing material and the area occupation ratio of the third dummy patterns with respect to the sealing material.

(34) Next, a liquid crystal device according to the present invention comprises a pair of substrates bonded by a sealing material, a plurality of first electrodes formed on the surface of one of the substrates, and a plurality of second electrodes formed on the surface of the other substrate, a driving region being provided inside the sealing material; wherein the first electrodes are provided with wiring lines which pass through a part of the sealing material formed at one side of the driving region and which are led towards the outside, and first dummy patterns which pass through a part of the sealing material formed at the other side of the driving region; the second electrodes are provided with third dummy patterns which oppose the wiring lines, and second dummy patterns which oppose the first dummy patterns; the sum of the width of the parts of the first dummy patterns which pass through the sealing material and the width of the parts of the second dummy patterns which pass through the sealing material has a value which leans more towards the sum of the width of the parts of the wiring lines which pass through the sealing material and the width of the parts of the third dummy patterns which pass through the sealing material than two times the width of the first electrodes; and the sum of the spacing between the parts of the first dummy patterns which pass through the sealing material and the spacing between the parts of the second dummy patterns which pass through the sealing material has a value which leans more towards the sum of the spacing between the parts of the wiring lines which pass through the sealing material and the spacing between the parts of the third dummy pattern which pass through the sealing material than two times the spacing between the first electrodes.

For example, when the sum of the width of the wiring lines and the width of the third dummy patterns is smaller than two times the width of the first electrodes, the sum of the width of the part passing the sealing material at the first dummy patterns and the width of the part passing the sealing material at the second dummy patterns is formed to be smaller than two times the width of the first electrodes, and furthermore, when the sum of the spacing between the wiring lines and the spacing between the third dummy patterns is smaller than two times the spacing between the first electrodes, the sum of the spacing between portions passing the sealing material at the first dummy patterns and the spacing between portions passing the sealing material at the second dummy patterns is formed to be smaller than two times the spacing between the first electrodes.

According to the liquid crystal device having the structure described above, regarding the wiring lines and the third dummy patterns which pass both the front and rear surfaces of the part at one side of the sealing material, as well as the first dummy patterns and second dummy patterns which pass both the front and rear surfaces of the part at the other side of the sealing material, because both the sum of the widths and the sum of the spacings are closer in value to each other than two times the width and two times the spacing of the first electrodes, the difference in substrate spacing at both portions of the sealing material can be reduced.

(35) In the liquid crystal device with the structure described above, the sum of the width of the parts of the first dummy patterns which pass through the sealing material and the width of the parts of the second dummy patterns which pass through the sealing material may be closer in value to the sum of the width of the parts of the wiring lines which pass through the sealing material and the width of the parts of the third dummy patterns which pass through the sealing material than two times the width of the first electrodes; and the sum of the spacing between the parts of the first dummy patterns which pass through the sealing material and the spacing between the parts of the second dummy patterns which pass through the sealing material may be closer in value to the sum of the spacing between the parts of the wiring lines which pass through the sealing material and the spacing between the parts of the third dummy pattern which pass through the sealing material than two times the spacing between the first electrodes.

More preferably, the sum of the width of the part passing the sealing material at the first dummy patterns and the width of the part passing the sealing material at the second dummy patterns is set to be substantially the same as the sum of the width of the part passing the sealing material at the wiring lines and the width of the part passing the sealing material at the third dummy patterns, and furthermore, the sum of the spacing between the parts passing the sealing material at the first dummy patterns and the spacing between the parts passing the sealing material at the second dummy patterns is set to be substantially the same as the sum of the spacing between the parts passing the sealing material at the wiring lines and the spacing between the parts passing the sealing material at the third dummy patterns.

(36) In the liquid crystal device with the structure described above, spacers for regulating the spacing between the substrates may be mixed in the sealing material. Since the degree of crushing of the spacers changes according to increases and decreases in the area occupation ratios of the individual patterns passing through the sealing material and the substrate spacing changes in response to this degree of crushing, the present invention is particularly effective when applied to the case where the spacers are mixed in the sealing material.

(37) The liquid crystal device with the structure described above may form a simple-matrix-type liquid crystal panel by forming electrodes, which orthogonally intersect each other, in the form of stripes on each of the surfaces of the pair of substrates. The present invention can be applied to such a simple-matrix-type liquid crystal panel and also to an active-matrix-type liquid crystal panel; however, it is preferably applied to the simple-matrix-type liquid crystal panel. The reason is that, in the simple-matrix-type liquid crystal panel, a difference in pattern width between the wiring lines and the electrodes easily occurs.

(38) The liquid crystal device with the structure described above further comprises color filters including a plurality of color elements, wherein, the plurality of electrodes which are formed on the surface of one of the pair of the substrates are formed at each color element.

In the case where color filters are used, as in this liquid crystal device, since it is necessary to provide the electrodes corresponding to each of the plurality of color elements (for example, the three colors, red, green, and blue), the number of electrodes increases and, as a result, it is necessary to reduce the electrode width. In this case, in order to control the increase in electrical resistance, the electrodes must be formed with a thickness which is increased by that amount, and therefore, the effect on the substrate spacing due to the difference in area occupation ratios of the individual patterns passing through the sealing material is large. Furthermore, since an increase in the number of electrodes increases the overall degree of convergence of the wiring lines, the difference between the width of the electrodes and the width of the wiring lines as well as the difference between the spacing between the electrodes and the spacing between the wiring lines increase. Therefore, a difference in substrate spacing easily occurs, and for that reason, it is particularly effective to apply the present invention.

(39) In the liquid crystal device with the structure described above, an IC chip may be mounted on at least one of the pair of substrates and the wiring lines may be connected to terminals of the IC chip.

In the liquid crystal device having the structure described above, since it is necessary to converge the wiring lines towards the terminal portion of the mounted IC chip, the difference between the wiring line width and the electrode width as well as the difference between the wiring line pitch and the electrode pitch are easily increased, and therefore, it is particularly effective to apply the present invention.

(40) Next, the electronic apparatus according to the present invention comprises a liquid crystal device and control means for controlling the operation of the liquid crystal device, wherein the liquid crystal device may be formed of the liquid crystal device having the various structures described above. As such an electronic apparatus, as long as it is provided with a liquid crystal device, the kind of apparatus is not significant; however, in particular, portable electronic devices such as mobile telephones, mobile information terminals, etc. are suitable.

BRIEF DESCRIPTION OF THE DRAWINGS

FIG. 1 is a partially cut-away plan view showing one embodiment of a liquid crystal device according to the present invention.

FIG. 2 is a cross sectional view showing the cross-sectional structure of the liquid crystal device taken along line II—II in FIG. 1.

FIG. 3 shows an enlarged view of the portions indicated by arrows A and B in FIG. 1.

FIG. 4 is a diagram for explaining the relationship between the electrode film thickness and the spacers.

FIG. 5 is a partially cut-away plan view showing the planar structure of another embodiment of the liquid crystal panel which is the principal element of the liquid crystal device according to the present invention.

FIG. 6 is a sectional view showing the cross-sectional structure of the liquid crystal panel taken along the line VI—VI in FIG. 5.

FIG. 7 is an enlarged plan view showing the region indicated by arrow VII in FIG. 5.

FIG. 8 is an enlarged plan view showing the region indicated by arrow VIII in FIG. 5.

FIG. 9(a) is a sectional view showing the cross-sectional structure of a sealing portion in a conventional liquid crystal panel, and FIG. 9(b) is a sectional view showing the cross-sectional structure of a sealing portion in the liquid crystal panel shown in FIG. 5.

FIG. 10 is an enlarged plan view showing the region indicated by arrow X in FIG. 5.

FIG. 11 is an enlarged plan view showing the region indicated by arrow XI in FIG. 5.

FIG. 12 is a block diagram showing one embodiment of the electronic apparatus according to the present invention.

FIG. 13 is a perspective diagram showing another embodiment of an electronic apparatus according to the present invention.

FIG. 14 is a perspective diagram showing yet another embodiment of an electronic apparatus according to the present invention.

FIG. 15 is a plan view showing the major portion of one example of a conventional liquid crystal device.

FIG. 16 is a partially cut-away plan view showing another example of a conventional liquid crystal device.

FIG. 17 is a diagram showing an enlarged view of the principal part in FIG. 16.

BEST MODE FOR CARRYING OUT THE INVENTION

FIRST EMBODIMENT

The case in which a COG-type liquid crystal device, which is a simple matrix type, is applied to the present invention will be described below as an example. FIG. 1 shows one embodiment of a liquid crystal device according to the present invention. This liquid crystal device 1 includes a pair of substrates 3a and 3b which are bonded to each other by a sealing material 2. The first substrate 3a has a substrate projecting part 4a which projects further outside than the second substrate 3b, and the second substrate 3b has a substrate projecting part 4b which projects further outside than the first substrate 3a.

A liquid crystal driving IC 6a is mounted on the surface of the substrate projecting part 4a with an ACF (Anisotropic Conductive Film) 7, and a liquid crystal driving IC 6b is mounted on the surface of the substrate projecting part 4b with the ACF 7. In the present embodiment, the liquid crystal driving IC 6a includes a data signal supplying circuit and the liquid crystal driving IC 6b includes a scanning signal supplying circuit.

As shown in FIG. 2, the first substrate 3a has a structure in which stripe-shaped first electrodes 9a are formed on the inside surface of a base member 8a which is made of glass, plastic, or the like, an orientation film 11a is deposited thereon, and then a polarizing plate 12a is mounted onto the outside surface of the base member 8a by, for example, bonding with an adhesive. The polarizing plate 12a has a transflector 26 applied thereto. Likewise, the second substrate 3b has a structure in which color filters 13 are formed on the inside surface of a base member 8b which is made of glass, plastic, or the like, stripe-shaped second electrodes 9b are formed thereon, an orientation film 11b is formed on the second electrodes 9b, and then a polarizing plate 12b is mounted onto the outside surface of the base member 8b by, for example, bonding with an adhesive.

The first electrodes 9a and the second electrodes 9b are formed by a lithographic method or the like in a predetermined pattern, for example, in the form of stripes, using, for example, ITO (Indium Tin Oxide) as the material. The orientation film 11a and the orientation film 11b are formed by applying, for example, a polyimide solution followed by baking. The main chains of the polymer in this polyimide are drawn out in a predetermined direction by applying a rubbing treatment, and the liquid crystal molecules of the liquid crystal injected into the cell gap are oriented along the stretching direction of the orientation layer.

In the actual liquid crystal device, apart from the optical elements described above, other optical elements may be provided as necessary. For example, a planarizing layer may be formed on top of the color filter 13. Furthermore, it is possible to place a phase plate either between the base member 8b and the polarizing plate 12b or between the base member 8a and the polarizing plate 12a.

Spacers 14 having, for example, a spherical shape, are distributed on the inside surface of the first substrate 3a or the second substrate 3b. Then, the first substrate 3a and the second substrate 3b are bonded together by a sealing material 2 in an aligned state, that is to say, they are positioned and brought together so that the first electrodes 9a and the second electrodes 9b orthogonally intersect each other.

A liquid crystal injection port 2a is formed at an appropriate position of the sealing material 2, and, through this liquid crystal injection port 2a, liquid crystal, a STN (Super Twisted Nematic) liquid crystal L in the present embodiment, is injected into the region surrounded by the first substrate 3a, the second substrate 3b, and the sealing material 2, that is to say, a liquid crystal encapsulating region. Then, after injection, the liquid crystal injection port 2a is sealed with a resin or the like. The function of the spacers 14 is to keep the thickness of the cell gap constant. Spherical or cylindrical gap members, that is to say, spacers 16, are dispersed in the sealing material 2. These spacers 16 also function to keep the thickness of the cell gap constant.

In FIG. 1 the stripe-shaped first electrodes 9a which are formed on the first substrate 3a are patterned so that they pass through the sealing material 2 and are extended onto the substrate projecting part 4a, and these extended patterns, that is to say, the wiring lines 17a, are electrically connected to the terminals of the liquid crystal driving IC 6a by conductive particles included in the ACF 7. Reference numeral 18a refers to terminal patterns which are formed on the surface of the substrate projecting part 4a, and these terminal patterns are electrically connected to other terminals of the liquid crystal driving IC 6a by the conductive particles included in the ACF 7.

On the other hand, the stripe-shaped second electrodes 9b which are formed on the second substrate 3b are patterned so that they pass through the sealing material 2 and are extended onto the substrate projecting part 4b, and these extended patterns, that is to say, the wiring lines 17b, are electrically connected to the terminals of the liquid crystal driving IC 6b by conductive particles included in the ACF 7. Reference numeral 18b refers to terminal patterns which are formed on the surface of the substrate projecting part 4b, and these terminal patterns are electrically connected to other terminals of the liquid crystal driving IC 6b by the conductive particles included in the ACF 7.

For convenience, only a few of the first electrodes 9a and the second electrodes 9b are shown with a large spacing in FIG. 1; however, in practice a larger number of electrodes are formed at high density in parallel to each other and with a smaller spacing. For example, in the case of a monochrome display, rather than a color display, the number of first electrodes 9a formed at the data-line side is 120, and the number of second electrodes 9b formed at the scanning-line side is 160. In the case of the color display, as in the present embodiment, the number of first electrodes 9a formed at the data-line side is 120×3=360, and the number of second electrodes 9b formed at the scanning-line side is 160.

FIG. 3 shows an expanded view of the portions indicated by arrow A and arrow B in FIG. 1. As shown in FIG. 3, the wiring lines 17a of the first electrodes 9a pass underneath the sealing material 2 and extend onto the substrate projecting part 4a. These wiring lines 17a are formed with a smaller width than the first electrodes 9a in the liquid crystal encapsulating region R. The reason for this is so that the wiring lines 17a can converge towards the liquid crystal driving IC 6a (Refer to FIG. 1). On the other hand, the first electrodes 9a have dummy patterns 19a which pass underneath the sealing material 2 at the side opposite the substrate projecting part 4a. These dummy patterns 19a are formed in order to prevent the height of the liquid crystal encapsulating region R, that is to say, the cell gap, or in other words, the cell thickness, from becoming nonuniform between the substrate projecting part 4a side and the side opposite thereto. In the present embodiment, these extended dummy patterns 19a are formed with a smaller width than the electrodes 9a in the liquid crystal encapsulating region R.

Regarding the second electrodes 9b which are formed on the second substrate 3b, similarly to the first electrodes 9a, the wiring lines 17b are formed with a smaller width than the second electrodes 9b. In addition, although they are not shown in FIG. 3, at the side opposite to the substrate projecting part 4b, the second electrodes 9b have dummy patterns with a smaller width than the second electrodes 9b, similarly to the first electrodes 9a. Without being especially limited, when reference is made to the wiring lines 17a in the description given below, the wiring lines 17b are also included, and furthermore, when reference is made to the dummy patterns 19a, the dummy patterns of the second electrodes 9b are also included.

In the present embodiment, as described above, since the dummy patterns 19a are formed with a width which is smaller than the width of the first electrodes 9a, the areal condition of the wiring lines 17a which pass underneath the sealing material 2 at the substrate projecting part 4a side and the areal condition of the dummy patterns 19a which pass underneath the sealing material 2 at the side opposite thereto can be set to be closer than in the case of the conventional device shown in FIG. 15 or substantially the same. Therefore, the cell thickness nonuniformity between the substrate projecting part 4a side and the side opposite thereto is reduced, and thus it is possible to make the cell thickness uniform.

In the present embodiment, the spacers 16 are included in the sealing material 2. As in the conventional device shown in FIG. 15, when there is a large difference in area between the wiring lines 156a and the dummy patterns 157a, there is a large difference between the number of spacers 158 sitting on the wiring lines 156a and the number of spacers 158 sitting on the dummy patterns 157a. Pressure is applied to these spacers 158 by the first substrate 151a and the second substrate 151b; however, when there is a large difference in the number of spacers 158 at the wiring line 156a side and at the dummy pattern 157a side, when the spacers 158 receive the pressure, the amount of crushing at both sides is different. As a result, there is a danger that a nonuniformity in the cell thickness will occur between the wiring line 156a side and the dummy pattern 157a side.

Accordingly, as in the present embodiment shown in FIG. 3, if the width of the dummy patterns 19a is set to be smaller than the width of the first electrodes 9a in the liquid crystal encapsulating region R, the number of spacers 16 sitting on the dummy patterns 19a can be brought close to or substantially the same as the number of spacers 16 sitting on the wiring lines 17a. Therefore, the occurrence of nonuniformity in the cell thickness can be prevented.

As in the present embodiment, in the case where color display is performed by using the color filters 13 (refer to FIG. 2), since the number of first electrodes 9a is large, the width of the individual electrodes 9a must be small. In that case, the width of the wiring lines 17a which extend from the first electrodes 9a must also be made accordingly smaller. Therefore, when the width of the electrodes is made smaller, in order to maintain the electrical resistance of the electrodes at a fixed value, the film thickness of the electrodes, and thus the film thickness of the wiring lines 17a, must be increased.

When the relationship between the film thickness of the wiring lines 17a and the spacers 16 is examined, as shown in FIG. 4(*a*), when the film thickness of the wiring lines 17a is small, there is not a very large change in the cell gap G due to whether or not the spacers 16 are sitting on the wiring lines 17a. It is thought that the reason for this is that, since the wiring lines 17a are thin, even the spacers 16 which exist between pairs of adjacent wiring lines 17a can contribute to maintaining the cell gap G.

When the film thickness of the wiring lines 17a becomes large, as shown in FIG. 4(*b*), the degree to which the spacers 16 existing between pairs of adjacent wiring lines 17a maintain the cell gap G is small, and, for that reason, conditions such as whether or not the spacers 16 are sitting on the wiring lines 17a, or whether the number of such spacers is large or small, exert a large influence on the cell gap G.

Since color filters are used in the present embodiment, the width of the electrodes 9a is set to be small. Accordingly, when the film thickness of the electrodes 9a is set to be large, since there is a large difference in the number of spacers 158 sitting on the wiring lines 156a and the dummy patterns 157a shown in FIG. 15 as a result of the large difference in their widths, there is a risk that the cell gap G will become nonuniform, as explained in FIG. 4(*b*). Therefore, in the present embodiment, when the width of the dummy patterns 19a in FIG. 3 is decreased and thus brought close to or substantially the same as the width of the wiring lines 17a, it is possible to prevent the occurrence of a large difference in the number of spacers 158 sitting on both the dummy patterns 19a and the wiring lines 17a. Therefore, it is also possible to prevent nonuniformity in the cell gap G.

In particular, in the present embodiment, the area occupation ratio of the portions of the dummy patterns 19a which pass through the sealing material 2 is set to substantially the same value, which is desirably 40% or more, of the area occupation ratio of the portions of the wiring lines 17a passing through the sealing material 2. The area occupation ratio referred to here means the proportion of the area of the wiring lines 17a passing through the sealing material 2 and the area of the dummy patterns 19a passing through the sealing material 2, using the area when the electrodes 9a pass through the sealing material 2 with their original, unchanged width as a reference.

When the area occupation ratio of the dummy patterns 19a and the area occupation ratio of the wiring lines 17a are set to be substantially the same, since the areal condition of the wiring lines 17a and the areal condition of the dummy patterns 19a with respect to the sealing material 2 are substantially the same, it is possible to prevent the occurrence of nonuniformity in the cell gap. Moreover, when the spacers 16 are included in the sealing material 2, it is possible to make the numbers of spacers 16 sitting on the dummy patterns 19a and the wiring lines 17a substantially the same. Therefore, it is possible to securely prevent the occurrence of nonuniformity in the cell gap.

When the area occupation ratios of the dummy patterns 19a and the wiring lines 17a are set to be the same, i.e. approximately 40% or more, it is possible to set the film thickness of the first electrodes 9a to the desired dimensions according to the size of the spacers 16. As a result, it has been experimentally confirmed by the present inventors that this is desirable in order to obtain a uniform cell gap.

The panel structure shown in FIG. 2 which is formed by bonding a first substrate 3a and a second substrate 3b with a sealing material 2 and injecting a liquid crystal L into the interior is generally referred to as a liquid crystal panel 5. In the present embodiment, the liquid crystal driving IC 6a is directly mounted on the substrate projecting part 4a of the first substrate 3a in the liquid crystal panel 5, and the liquid crystal driving IC 6b is directly mounted on the substrate projecting part 4b of the second substrate 3b (refer to FIG. 1), thus forming a COG-type liquid crystal device, as mentioned previously.

Furthermore, a so-called backlight 22 is provided as an illumination device at the side opposite to the display surface of the liquid crystal panel 5, in other words, at the lower surface of the liquid crystal panel 5 in FIG. 2, with a cushioning material 21 formed of rubber or the like therebetween. This backlight 22 includes a light-guiding member 23 which is formed of a transparent resin or the like, a diffusing sheet 24 which is provided on the surface of the light-guiding member 23 at the liquid crystal panel 5 side, a reflective sheet 27 which is provided on the surface of the light-guiding member 23 opposite to the liquid crystal panel 5 side, and an LED (Light Emitting Diode) 28 as a light source which is positioned so as to face a light incident surface 23a of the light-guiding member 23. Reference numeral 29 indicates an LED substrate on which a suitable wiring pattern for supporting the LED 28 is formed.

A control board 31 is disposed at an appropriate location around the liquid crystal panel 5, for example, at the rear surface of the backlight 22. On this control board 31 there is mounted a control circuit 32 for controlling the operation of the liquid crystal device 1 based on commands from a main control unit of the electronic apparatus in which the liquid crystal device 1 is used, for example a portable telephone, a mobile computer, and so on. Terminals 33 are formed at appropriate locations on this control board 31.

The terminal portions of a connection element, for example, an FPC (Flexible Printed Circuit) 36, are electrically connected to terminal patterns 18a which are formed at the edge of the substrate projecting part 4a of the first substrate 3a which forms the liquid crystal panel 5 by an ACF 34. Then the other terminal portions of the FPC 36 are electrically connected to the terminals 33 of the control board 31 by soldering or by some other electrical connection technique. By doing this, the control board 31 and the first substrate 3a are electrically connected by the FPC 36. Although it is not shown in FIG. 2, in the same way, the terminal patterns 18b which are formed at the edge of the substrate projecting part 4b of the second substrate 3b shown in FIG. 1 are also electrically connected to the control board 31 by the FPC or the like.

Regarding the liquid crystal device 1 which is formed as described above, in FIG. 2, in bright surroundings, ambient light incident on the liquid crystal device 1 passes through the liquid crystal panel 5, is reflected by the transflector 26, passes through the polarizing plate 12a, and is supplied to the liquid crystal panel 5. The orientation of the liquid crystal L is controlled at each pixel according to the voltage applied across the first electrodes 9a which act as data lines and the second electrodes 9b which act as scanning lines. Therefore, the light which is supplied to the liquid crystal L is modulated at each pixel, is selectively transmitted through the polarizing plate 12b, and displays characters or other images towards the outside. A reflective-type display is thus performed.

When the liquid crystal device 1 surroundings are dark, the LED 28 emits light, the emitted light enters the light-guiding member 23 through the light incident surface 23a of the light-guiding member 23, is reflected by the reflective sheet 27, and, after being diffused by the diffusing sheet 24, is supplied to the liquid crystal panel 5. Therefore, by performing the same process on the supplied light as in the reflective-type display described above, characters and other images are displayed towards the outside of the liquid crystal panel 5. A transmissive-type display is thus performed.

SECOND EMBODIMENT

FIG. 5 shows a liquid crystal panel which is an element of another embodiment of the liquid crystal device according to the present invention. Although not shown in the figure, a polarizing plate, a backlight acting as a light source, a flexible board acting as a wiring member, a support member, and so on are mounted, as necessary, to the liquid crystal panel 45 shown here, thus forming the liquid crystal device. Furthermore, the liquid crystal panel 45 is a simple-matrix type, COG-type liquid crystal panel.

The liquid crystal panel 45 in FIG. 5 is formed by bonding together a first substrate 3a and a second substrate 3b with a sealing material 2 therebetween. A substrate projecting part 4a, which projects further towards the outside than the second substrate 3b, is formed on the first substrate 3a, and a substrate projecting part 4b, which projects further towards the outside than the first substrate 3a, is formed on the second substrate 3b. Furthermore, the sealing material 2 is disposed in the form of a frame so as to surround the periphery portion of the rectangular planar portion shown in the drawing, which is the portion where the first substrate 3a and the second substrate 3b overlap. There are individual parts, that is, a part 2a, a part 2b, a part 2c, and a part 2d at the four parts which form the sides of the rectangle.

By arranging a plurality of strip-shaped first electrodes 9a, which are formed of ITO or the like, parallel to each other on the inside surface of the first substrate 3a (that is to say, the front surface in FIG. 5), a stripe-shaped pattern is formed. First wiring lines 17a are integrally formed at one end of these first electrodes 9a, and these first wiring lines 17a pass through the part 2b of the sealing material 2 and are extended onto the surface of the substrate projecting part 4a. At the other end of the first electrodes 9a, extended dummy patterns 19a, which are connected to the first electrodes 9a, are formed. These extended dummy patterns 19a are formed so as to pass through the part 2d of the sealing material 2.

By arranging a plurality of strip-shaped second electrodes 9b, which are formed of ITO or the like, parallel to each other on the inside surface of the second substrate 3b (that is to say, the rear surface in FIG. 5), a stripe-shaped pattern is formed. Second wiring lines 17b are integrally formed at one end of these second electrodes 9b, and these second wiring lines 17b pass through the part 2a of the sealing material 2 and are extended onto the surface of the substrate projecting part 4b. At the other end of the second electrodes 9b, extended dummy patterns 19b, which are connected to the second electrodes 9b, are formed. These extended dummy patterns 19b are formed so as to pass through the part 2c of the sealing material 2.

Color filters 13 are formed on the inside surface of the first substrate 3a, as shown in FIG. 6. These color filters 13 are formed by suitably arranging, for example, red (R), green (G), and blue (B) color elements, and depositing a protective film thereon. Then the first electrodes 9a are formed on top of the color filters 13. Furthermore, an orientation film 11a made of a polyimide resin or the like is formed on top of the first electrodes 9a. On the other hand, the second electrodes 9b are directly formed on the inside surface of the second substrate 3b, and an orientation film 11b made of a polyimide resin or the like is formed on top of the second electrodes 9b.

One first electrode 9a is formed for each color element of the color filters 13, and three first electrodes 9a and one second electrode 9b correspond to one pixel of the color display. One pixel is formed of three dots which are separately formed at the intersecting portions of the first electrodes 9a and the second electrodes 9b.

The sealing material 2 is made from, for example, a thermosetting resin, and spherical or cylindrical gap members, that is to say, spacers 16, which are formed of resin are mixed in the sealing material 2. Liquid crystal L is encapsulated in the inside region surrounded by the sealing material 2, and spacers 14 having a slightly smaller diameter than the spacers 16 are distributed inside the liquid crystal encapsulating region which is bounded by the sealing material 2. These spacers 14 and 16 control the spacing between the substrates so that, when the first substrate 3a and the second substrate 3b are bonded with the uncured sealing material 2 therebetween and then pressed together, the spacing between the two substrates is constant, for example, 5 to 10 µm. The liquid crystal panel 45 is formed by carrying out hardening treatment on the sealing material 2 under conditions in which the spacers 14 and 16 control the spacing between the substrates by applying pressure during press-bonding.

In FIG. 5, the IC chips 6a and 6b, which have built-in liquid crystal driving circuits, are mounted on the substrate projecting parts 4a and 4b, respectively. Also, input terminals 18a and 18b are formed at the edges of the substrate projecting parts 4a and 4b, respectively. The connection terminals of the IC chips 6a and 6b are electrically connected to the wiring lines 17a and 17b as well as to the input terminals 18a and 18b by the ACF 7 (refer to FIG. 6). The ACF 7 is, for example, a resin having many conductive particles included therein, and, by applying thermocompression thereto, has a function of imparting conductivity only in the thickness direction.

FIG. 7 is a diagram showing an enlarged view of the region indicated by the arrow VII in FIG. 5, and schematically shows an enlarged view of the planar shape of the second electrodes 9b. As is shown in FIG. 6 and FIG. 7, on the second substrate 3b the second electrodes 9b, the second wiring lines 17b, and the extended dummy patterns 19b are formed.

On the first substrate 3a which opposes the second substrate 3b, wiring line dummy patterns 37a, which are made of ITO or the like, are formed as part of the first electrodes 9a (refer to FIG. 5) at the same time as the first electrodes 9a so as to oppose the second wiring lines 17b. Furthermore, opposing dummy patterns 38a, which are made of ITO or the like, are formed as part of the first electrodes 9a (refer to FIG. 5) at the same time as the first electrodes 9a to oppose the extended dummy patterns 19b. Both the wiring line dummy patterns 37a and the opposing dummy patterns 38a are separate from the first electrodes 9a (refer to FIG. 5), that is to say, they are unconnected patterns.

In FIG. 7, the second wiring lines 17b pass in front of the part 2a of the sealing material 2 in the figure; the wiring line dummy patterns 37a pass behind the part 2a of the sealing material 2 in the figure; the extended dummy patterns 19b pass in front of the part 2c of the sealing material 2 in the figure; and the opposing dummy patterns 38a pass behind the part 2c of the sealing material 2 in the figure.

In the present specification, the dummy patterns which are connected to the first electrodes 9a and the second electrodes 9b are integrally formed with these electrodes and with the wiring lines connected to these electrodes, and they are provided with a fixed potential during driving. Also, the dummy patterns which are separated from the first electrodes 9a and the second electrode 9b are electrically isolated from these electrodes and from the wiring lines which are connected to these electrodes, and they are not provided with a potential during driving.

The extended dummy patterns 19b are dummy patterns at the side opposite to the wiring lines 17b in the second electrodes 9b, and they can be part of the dummy patterns which are separated from the second electrodes 9b. In the present embodiment, these extended dummy patterns 19b are formed as part of the dummy patterns which are connected to the second electrodes 9b.

The wiring line dummy patterns 37a are dummy patterns which are disposed opposite to the wiring lines 17b, and they may be part of the dummy patterns which are connected to the first electrodes 9a (refer to FIG. 5), or alternatively, they may be part of the dummy patterns which are separated from the first electrodes 9a. In the present embodiment, these wiring line dummy patterns 37a are formed as part of the dummy patterns which are separated from the first electrodes 9a.

Generally, dummy patterns which are separated from the electrodes are used as the dummy patterns which are provided opposite the wiring lines which extend from the electrodes and opposite the dummy patterns which are connected to the electrodes.

In FIG. 7, from the ends of the second electrodes 9b, the wiring lines 17b pass through the part 2a of the sealing material 2 with a width which is smaller than the width of the second electrodes 9b, that is to say, with a narrower width. Accordingly, the wiring lines 17b which pass through the part 2a of the sealing material 2, are led towards the IC chip 6b mounting region, which is defined on the substrate projecting part 4b, as shown in FIG. 5. The connection terminals of the IC chip 6b, which are not shown in the drawing, are formed with a pitch, in other words, a spacing between the terminals, which is much smaller than the spacing with which the second electrodes 9b are formed; that is to say, they are narrowly formed. Therefore, the wiring lines 17b pass through the part 2a of the sealing material 2 while being directed towards the IC chip mounting region and converging.

The wiring line dummy patterns 37a opposing the second wiring lines 17b extend on the first substrate 3a, which opposes the second wiring lines 17b, along the direction of the second wiring lines 17b, and they terminate immediately after passing through the part 2a of the sealing material 2.

On the first substrate 3a which opposes the second electrodes 9b, the opposing dummy patterns 38a which oppose the extended dummy patterns 19a split into two, that is to say, they are divided in the direction in which the second electrodes 9b are arrayed, in other words, the direction in which the part 2c of the sealing material 2 extends in FIG. 7, and then they pass through the part 2c with a width and a spacing P1 which are different from the width and the spacing P0 of the second electrodes 9b.

In other words, in the embodiment shown in FIG. 7, the width of portions 19bb of the extended dummy patterns 19b which pass through the sealing material is smaller than the width of the second electrodes 9b, and furthermore, the spacing P1 of the sealing material passing portions 19bb of the extended dummy patterns 19b is smaller than the spacing P0 of the second electrodes 9b.

Moreover, the width of portions 38aa of the opposing dummy patterns 38a which pass through the sealing material is smaller than the width of the second electrodes 9b, and furthermore, the spacing P2 of the sealing material passing portions 38aa of the opposing dummy patterns 38a is smaller than the spacing P0 of the second electrodes 19b.

As a result of the above, the area occupation ratios of the extended dummy patterns 19b and the opposing dummy patterns 38a with respect to the part 2c of the sealing material 2 are each significantly smaller than the area occupation ratio of the second electrodes 9b with respect to the part 2c in which the second electrodes 9b pass through the part 2c of the sealing material 2.

Furthermore, regarding the extended dummy patterns 19b and the opposing dummy patterns 38a shown in FIG. 7, the spacings P3 and P4 of the sealing material passing parts which extend from a common second electrode 9b and are divided, and the spacings P5 and P6 between neighboring extended dummy patterns 19b which extend from adjacent second electrodes 9b and between sealing material passing parts of the opposing dummy patterns 38a are substantially the same. Therefore the sealing material passing parts 19bb and 38aa of the plurality of extended dummy patterns 19b, which extends from the plurality of second electrodes 9b, and the opposing dummy patterns 38a, respectively, are arrayed with a substantially constant period. In the present embodiment, the sum of the width of the sealing material passing parts 19bb of the extended dummy patterns 19b and the width of the sealing material passing parts 38aa of the opposing dummy patterns 38a is set so as to be substantially the same as the sum of the width of sealing material passing parts 17bb of the second electrodes 9b and the width of sealing material passing parts 37aa of the wiring line dummy patterns 37a.

Moreover, the sum of the spacing P1 of the sealing material passing parts 19bb of the extended dummy patterns 19b and the spacing P2 of the sealing material passing parts 38aa of the opposing dummy patterns 38a is set so as to be substantially the same as the sum of the spacing P7 of the sealing material passing parts 17bb of the second wiring lines 17b and the spacing P8 of the sealing material passing parts 37aa of the wiring line dummy patterns 37a.

FIG. 8 shows the region indicated by arrow VIII in FIG. 5 and, mainly, it schematically shows part of the first electrodes 9a and the second electrodes 9b. In this figure, the planar shape of the first electrodes 9a is shown by the broken lines and the planar shape of the second electrodes 9b is shown by the solid lines. The liquid crystal is driven at each pixel, and inside a driving region Z where a suitable display can be formed, pixels which are made up of portions where the first electrodes 9a and the second electrodes 9b mutually intersect are arranged in the form of a matrix.

In cases where this liquid crystal panel 45 (refer to FIG. 5) is installed as a display in various kinds of electronic apparatuses, a peripheral region Y, which is externally exposed as part of the display screen at the periphery of the driving region Z, is provided outside the driving region Z. No display is formed in this peripheral region Y. The sealing material 2 is disposed further outside this peripheral region Y.

In cases where this liquid crystal panel 45 (refer to FIG. 5) is installed as a display in various kinds of electronic apparatuses, the peripheral region Y is positioned further inside a marginal portion, which is a surface of the display screen that is externally exposed, that is, a portion which is referred to as a so-called dead region, and also outside the driving region Z. Since this peripheral region Y is noticeable by users of the display or electronic apparatus, it is preferable that, as much as possible, its appearance be made the same as that of the driving region Z when it is not being driven. The various dummy patterns mentioned above are formed in order to achieve this.

In order to reduce the difference in appearance of the area inside the peripheral region Y at the part 2a side of the sealing material 2 and the area at the part 2c side of the sealing material 2 by extending the divided form of the extended dummy patterns 19b and the opposing dummy patterns 38a deep inside the peripheral region Y, the present embodiment is configured such that appearance of the area at the part 2c side of the peripheral region Y is almost the same as the appearance of the area at the part 2a side of the peripheral region Y, which is realized by the second wiring lines 17b and the wiring line dummy patterns 37a.

In other words, since the widths and the spacings of the extended dummy patterns 19b and the opposing dummy patterns 38a are substantially the same as the width and the spacing of the second wiring lines 17b and the wiring line dummy patterns 37a, their appearances are also similar to such an extent that they cannot be distinguished.

Furthermore, the separated dummy patterns 17b' which are shown in FIG. 8 are formed as part of the second electrodes 9b and, as well as improving the uniformity of the appearance of the peripheral region Y, in order to make the patterns pass through the part 2a of the sealing material 2 under the same conditions, they are formed to be aligned with the second wiring lines 17b such that their width and spacing are substantially the same as those of the wiring lines 17b.

FIG. 9(a) shows the cross-sectional structure of a region in a conventional liquid crystal panel where the extended dummy patterns 119b and the opposing dummy patterns 138a which are disposed opposite to the extended dummy patterns 119b are formed. FIG. 9(b) shows the cross-sectional structure of the region in the present embodiment where the extended dummy patterns 19b and the opposing dummy patterns 38a which are disposed opposite thereto are formed.

Conventionally, as shown in FIG. 9(a), the extended dummy patterns 119b and the opposing dummy patterns 138a are extended with a width which is the same as the width of the second electrodes 112b toward the sealing material 2, and since they pass through the part 2c of the sealing material 2, many spacers 16 become caught between the extended dummy patterns 119b and the opposing dummy patterns 138a.

On the other hand, in the case of the present embodiment, as shown in FIG. 9(b), since the sealing material passing parts 19bb and the sealing material passing parts 38aa of the extended dummy patterns 19b and the opposing dummy patterns 38a, respectively, are formed with a smaller width and a smaller spacing, the number of spacers 16 caught between the sealing material passing parts 19bb of the extended dummy patterns 19b and the sealing material passing parts 38aa of the opposing dummy patterns 38a is reduced, and they receive a force during substrate bonding in accordance with the smaller number of spacers than in the case of the conventional structure. Therefore, since the force received by a single spacer 16 is larger and thus the amount of crushing of the spacer 16 is larger, the substrate spacing in the vicinity of the part 2c of the sealing material is smaller than in the case of the conventional structure.

As a result of the above, in the present embodiment, compared to the conventional structure, the difference between the substrate spacing in the vicinity of the part 2c of the sealing material 2 and the substrate spacing in the vicinity of the part 2a of the sealing material 2 through which the second wiring lines 17b, which are formed with a smaller width and a smaller spacing than the second electrodes 9b, and the wiring line dummy patterns 37a pass is smaller. Therefore, the nonuniformity in substrate spacing in the driving region Z is also reduced.

In the present embodiment, a more preferable structure is one in which the sum of the area occupation ratios, with respect to the part 2a, of the wiring lines 17b and the wiring line dummy patterns 37a, which are positioned both in front of and behind the part 2a at one side of the sealing material 2, is substantially the same as the sum of the area occupation ratios, with respect to the part 2c, of the extended dummy patterns 19b and the opposing dummy patterns 38a, which are positioned both in front of and behind the part 2c at the other side of the sealing material 2, and furthermore, in which the spacings of these individual patterns are substantially the same as each other.

Accordingly, since the sums of the area occupation rations of the individual patterns passing in front of and behind both the part 2a and the part 2c of the sealing material 2 are identical to each other, the nonuniformity in the substrate spacing due to the difference in area occupation ratios can be reduced. Therefore, the display quality can be improved even more.

FIG. 10 is an enlarged plan view showing the region indicated by the arrow X in FIG. 5, and shows the planar form of the extended dummy patterns 19a which are integrally formed with the first electrodes 9a. Extended dummy patterns 19ai, which are formed with a width smaller than the first electrodes 9a, are integrally formed on first electrodes 9a which form one group. On the other hand, another group of the first electrodes 9a, which are adjacent to the first electrodes 9a forming that group, are split into two and are integrally provided with two extended dummy patterns 19ay.

The extended dummy patterns 19ai and the extended dummy patterns 19ay have the same width as each other, and furthermore, they are formed so that the spacings between them are exactly the same. Also, the extended dummy patterns 19ai and the extended dummy patterns 19ay both pass through the part 2d of the sealing material 2.

Opposing dummy patterns 38b are positioned opposite the extended dummy patterns 19ai and extended dummy patterns 19ay, the opposing dummy patterns 38b being formed at the same time as the second electrodes 9b and as part of the second electrodes 9b (see FIG. 5), which are formed on the front surface of the second substrate 3b (see FIG. 5) which faces the extended dummy patterns 19ai and 19ay. These opposing dummy patterns 38b are formed with the same width as each other and, furthermore, they are formed so that the spacings between them are exactly the same as each other.

FIG. 11 is an enlarged plan view showing the region indicated by the arrow XI in FIG. 5, and shows the vicinity of the region where the first wiring lines 17a pass through the sealing material. The first wiring lines 17a which lead from the first electrodes 9a have a width which is smaller than the width of the first electrodes 9a and, furthermore, they are formed such that they pass through the part 2b of the sealing material 2 while their mutual spacing becomes smaller. Wiring line dummy patterns 37b are formed as part of the second electrodes 9b (see FIG. 5) on the surface of the second substrate 3b which faces the first wiring lines 17a, these wiring line dummy patterns 37b are positioned opposite the first wiring lines 17a, and furthermore, they pass the part 2b of the sealing material 2 on the side opposite to the first wiring lines 17a.

In FIG. 10, regarding the first electrodes 9a, the width and the spacing at the region where the extended dummy patterns 19a pass through the sealing material are formed so as to be smaller than the width and the spacing of the first electrodes 9a, in the same way as in the case of the second electrodes 9b shown in FIG. 7. The width and the spacing at the region where the opposing dummy patterns 38b, which face the extended dummy patterns 19a, pass through the sealing material are also formed so as to be smaller than the width and the spacing of the first electrodes 9a.

The width and the spacing at the region where the extended dummy patterns 19a and the opposing dummy patterns 38b pass through the sealing material are formed so as to be substantially the same as the width and the spacing at the region where the first wiring lines 17a and the wiring line dummy patterns 37b shown in FIG. 11 pass through the sealing material. Therefore, the difference in substrate spacing between the part 2b and the part 2d of the sealing material 2 can be reduced.

In the embodiment described above, the opposing dummy patterns 38a which are provided on the first substrate 3a in FIG. 7 are formed by the divided branches of each pattern which is divided into two; however, instead of this, each individual sealing material passing region may be formed so as to be divided. Also, the opposing dummy patterns 38b which are provided on the second substrate 3b in FIG. 10 are formed so as to be divided at each individual sealing material passing region; however, instead of this, it is also possible to connect adjacent pairs of the opposing dummy patterns 38b to each other.

In the above embodiment, cases have been described wherein the pairs of patterns which are provided on both the first substrate 3a and the second substrate 3b, for example, the extended dummy patterns 19a and the opposing dummy patterns 38b in FIG. 10, the extended dummy patterns 19b and the opposing dummy patterns 38a in FIG. 7, the second wiring lines 17b and the wiring line dummy patterns 37a in FIG. 7, or the first wiring lines 17a and the wiring line dummy patterns 37b in FIG. 11, are provided so as to pass through the sealing material 2 with the same width and spacing as each other.

However, for the pairs of patterns which pass in front of and behind the sealing material 2, it is not necessary in general to form them with substantially the same width and spacing; for example, it is possible for the first electrodes 9a and the second electrodes 9b to have different widths and spacings or different area occupation ratios in accordance with the shape into which only one of the patterns, that is, either the front or the rear, is divided.

Furthermore, the embodiment described above was configured such that the patterns pass both in front of and behind the sealing material; however, instead of this, it is also possible to provide a structure such that the patterns pass the sealing material in only one place, that is either in front or behind.

THIRD EMBODIMENT

FIG. 12 shows one embodiment of a case in which a liquid crystal device according to the present invention is used as a display apparatus of various types of electronic apparatus. The electronic apparatus shown here has a display information output source 70, a display information processing circuit 71, a power supply circuit 72, a timing generator 73, and a liquid crystal device 74. Furthermore, the liquid crystal device 74 has a liquid crystal panel 75 and a driving circuit 76. The liquid crystal device 74 may be configured by using a liquid crystal device in which, for example, the liquid crystal panel 5 shown in FIG. 2 or the liquid crystal panel 45 shown in FIG. 5 is provided.

The display information output source 70 is provided with a memory such as a ROM (Read Only Memory) or a RAM (Random Access Memory), a storage unit such as a magnetic recording disk or an optical recording disk, and a synchronization circuit which synchronizes digital video signals, and, based on various types of clock signals which are generated by the timing generator 73, it supplies display information, such as video signals in a predetermined format, to the image information processing circuit 71.

The image information processing circuit 71 is provided with various kinds of well-known circuits, such as a serial-parallel conversion circuit, an amplifying/reversing circuit, a rotation circuit, a gamma correction circuit, and a clamping circuit; executes processing on the display information which is input, and supplies that video signal to the driving circuit 76 along with a clock signal CLK. The driving circuit 76 is configured to include a scanning line driving circuit, a data line driving circuit, an examination circuit, and so on. Also, the power supply circuit 72 supplies predetermined voltages to the individual structural elements.

FOURTH EMBODIMENT

FIG. 13 shows a mobile telephone which is one embodiment of the electronic apparatus according to the present invention. A mobile telephone 80 shown here has a plurality of operating buttons 81 and a liquid crystal device 82. The liquid crystal device 82 may be configured by using, for example, the liquid crystal device 1 which is shown in FIG. 2.

FIFTH EMBODIMENT

FIG. 14 shows another example of a mobile telephone which is one embodiment of the electronic apparatus according to the present invention. In this mobile telephone 90, a circuit board 92 is disposed inside a casing 91, and a liquid crystal panel 93 is installed facing this circuit board 92. Operating buttons 94 are arranged on the front surface of the casing 91, and an expandable and retractable antenna 96 is mounted at one end.

A speaker is disposed inside an earpiece unit 97 and microphone is built into a mouthpiece unit 98. Regarding the liquid crystal panel 93 which is disposed inside the casing 91, the display screen thereof, in other words, the surface combining the driving region Z and the peripheral region Y in FIG. 5, can be viewed through a display window 99 which is provided in the casing 91.

OTHER EMBODIMENTS

While the present invention has been described in terms of the preferred embodiments described above, the present invention is not limited to those embodiments, and various modifications are possible within the scope of the invention described in the claims.

For example, in the embodiment shown in FIG. 1, although the present invention is applied to a COG-type simple matrix liquid crystal device, it is of course also possible to apply the present invention to liquid crystal devices which do not have a configuration in which IC chips are directly mounted onto the substrate projecting parts, for example, liquid crystal devices which use TAB (Tape Automated Bonding) substrates or FPCs (Flexible Printed Circuits). Moreover, the present invention may also be applied to active matrix liquid crystal devices.

(Advantages)

As described above, in both the liquid crystal devices and the electronic apparatuses according to the present invention, since the width of the dummy patterns is formed to be smaller than the width of the electrodes in the driving region which is surrounded by the sealing material, it is possible to make the dimensional variations in the width of the dummy patterns and the width of the opposing wiring lines small, and accordingly, it is possible to reduce the nonuniformity in the cell thickness of the liquid crystal, that is to say, the spacing between the substrates, between the wiring line side and the dummy pattern side. Therefore, the display quality of the liquid crystal device can be improved.

The invention claimed is:

1. A liquid crystal device including a pair of substrates which are bonded by a sealing material and a driving region which is formed inside the sealing material, and comprising:
    a liquid crystal layer which is disposed between the pair of substrates and is surrounded by the sealing material;
    spacers which are dispersed in the sealing material; and
    electrodes, provided on a liquid crystal layer side of one of the substrates, including portions forming the driving region, wiring lines which overlap the sealing material at one side of the driving region while supplying a potential to the portions forming the driving region, and dummy patterns which are disposed at another side of the driving region while being connected to the portions forming the driving region,
    the dummy patterns include at least one first part and at least one second part, the first part includes a first prong and a second prong spaced apart from the first prong;
    the first prong, the second prong, and the second part each have the same width and are equally spaced apart from each other;
    one of the first parts is bordered by two different second parts and one of the second parts is bordered by two different first parts;
    the first part and the second part overlap the sealing material; and
    the width of each of the second part, the first prong, and the second prong is smaller than the portion of the electrodes forming the driving regions.

2. A liquid crystal device according to claim 1 wherein the width of the wiring lines at the region overlapping the sealing material is smaller than the width of the portions forming the driving region.

3. A liquid crystal device according to claim 1, wherein the width and spacing of the dummy patterns are made to be substantially the same as the width and spacing of the wiring lines.

4. A liquid crystal device including a pair of substrates which are bonded by a sealing material and a driving region which is formed inside the sealing material, and comprising:
    a liquid crystal layer which is disposed between the pair of substrates and is surrounded by the sealing material;
    spacers which are dispersed in the sealing material; and a plurality of electrodes, provided on a liquid crystal layer side of one of the substrates, including portions forming the driving region, wiring lines which overlap the sealing material at one side of the driving region while supplying a potential to the portions forming the driving region, and dummy patterns which are disposed at another side of the driving region while being connected to the driving region;

the plurality of dummy patterns include at least one of first parts and at least one of second parts, the first parts are formed by splitting the ends of the electrodes and the second part is formed by ends of the electrodes that are not split;

the second part and each of the split ends of the first part have the same width and are equally spaced apart from each other;

one of the first parts is bordered by two different second parts and one of the second parts is bordered by two different first parts;

the first parts and the second parts overlap the sealing material; and the combined width and spacing of the first parts and the second parts are substantially the same as the width and spacing of the wiring lines.

5. A liquid crystal device including a pair of substrates which are bonded by a sealing material and a driving region which is formed inside the sealing material, and comprising:

a liquid crystal layer which is disposed between the pair of substrates and is surrounded by the sealing material;

spacers which are dispersed in the sealing material;

a plurality of electrodes, provided on a liquid crystal layer side of one of the substrates, including portions forming the driving region, wiring lines which overlap the sealing material at one side of the driving region while supplying a potential to the portions forming the driving region, and a plurality of dummy patterns which are disposed at another side of the driving region while being connected to the portions forming the driving region; and an IC chip which is mounted on one of the substrates and which is connected to the wiring lines, wherein the individual wiring lines are disposed so as to converge towards the IC chip from the driving region;

the plurality of dummy patterns include at least one of first parts and at least one of second parts due to the fact that the individual dummy patterns have one of a plurality of first parts which are formed by splitting the ends of the electrodes and a second part which is formed by the end of the electrodes which are not split;

the second part and each of the split ends of the first part have the same width and are equally spaced apart from each other;

one of the first parts is bordered by two different second parts and one of the second parts is bordered by two different first parts;

the first parts and the second parts overlap the sealing material;

the combined width and spacing of the first parts and the second parts are substantially the same as the width and the spacing of the wiring lines; and each of the first parts and the second parts are more narrow than the portion of the electrodes forming the driving regions.

6. A liquid crystal device according to claim 5, wherein the widths of each of the individual first parts, the individual second parts, and the individual wiring lines are smaller than the widths of the individual portions forming the driving region.

7. A liquid crystal device comprising:

a pair of substrates;

a sealing material which bonds the substrates;

a driving region formed inside the sealing material;

a liquid crystal layer disposed between the substrates, the liquid crystal surrounded by the sealing material;

a plurality of spacers dispersed in the sealing material; and an electrode, provided on a liquid crystal layer side of one of the substrates, wherein the electrode includes a portion forming the driving region;

a wiring line overlapping the sealing material at one side of the driving region and supplying a potential to the portion forming the driving region; and a dummy pattern disposed at another side of the driving region and being connected to the portion forming the driving region;

the dummy pattern includes at least one of a first part and at least one of a second part, the first part includes a first prong and a second prong spaced apart from the first prong;

the first prong, the second prong, and the second part each have the same width and are egually spaced apart from each other;

one of the first parts is bordered by two different second parts and one of the second parts is bordered by two different first parts;

wherein the width of each of the first prong, the second prong, and the second part are smaller than the portions of the electrodes forming the driving region.

* * * * *